(12) United States Patent
Weed et al.

(10) Patent No.: US 7,650,253 B2
(45) Date of Patent: Jan. 19, 2010

(54) ACCELEROMETER AND METHOD FOR ERROR COMPENSATION

(75) Inventors: Michael E. Weed, Venice, FL (US); Thomas Rosenbauer, Easton, PA (US)

(73) Assignee: L-3 Communications Corporation, New York, NY (US)

( * ) Notice: Subject to any disclaimer, the term of this patent is extended or adjusted under 35 U.S.C. 154(b) by 0 days.

(21) Appl. No.: 12/117,538

(22) Filed: May 8, 2008

(65) Prior Publication Data
US 2009/0281756 A1  Nov. 12, 2009

(51) Int. Cl.
*G01C 19/00* (2006.01)
*G01C 17/38* (2006.01)

(52) U.S. Cl. .................................... 702/104; 73/1.78

(58) Field of Classification Search .............. 702/104, 702/85, 105, 141, 144, 183, 196, 81, 84, 702/92, 99, 127, 130, 131, 182, 189–191; 701/3, 7; 73/1.37, 1.38, 1.01, 1.75–1.78, 73/488, 497, 503, 503.3, 504.02, 504.03, 73/504.08, 504.18, 510, 511, 514.01, 514.02; 374/1, 100, 117
See application file for complete search history.

(56) References Cited

U.S. PATENT DOCUMENTS

| | | | |
|---|---|---|---|
| 3,948,096 A * | 4/1976 | Miller | 73/178 R |
| 4,336,718 A * | 6/1982 | Washburn | 73/497 |
| 6,000,287 A | 12/1999 | Menzel | |
| 6,853,947 B1 * | 2/2005 | Horton | 702/151 |
| 7,337,668 B2 * | 3/2008 | Condemine et al. | 73/509 |

* cited by examiner

*Primary Examiner*—Michael P. Nghiem
*Assistant Examiner*—Toan M Le
(74) *Attorney, Agent, or Firm*—Darby & Darby PC; Robert J. Sacco

(57) ABSTRACT

An accelerometer has an acceleration transducer producing uncorrected analog acceleration signals representing vertical, lateral, and longitudinal components of acceleration. An error correction system is connected to the acceleration transducer for receiving the uncorrected analog acceleration signals. The error correction system includes a system controller for generating a plurality of correction coefficients, an analog to digital converter which converts the uncorrected analog acceleration signals to uncorrected digital acceleration signals, a filter for filtering the uncorrected digital acceleration signals, an error compensation circuit receiving the correction coefficients to compensate the uncorrected digital acceleration signals, and a digital to analog converter which converts the corrected digital acceleration signals to corrected analog acceleration signals. The error compensation circuit corrects for bias offset, cross-axis alignment errors, scaling errors, and thermal offset. The system controller arranges a plurality of calibration measurements into a matrix and inverts the matrix to calculate the correction coefficients.

27 Claims, 19 Drawing Sheets

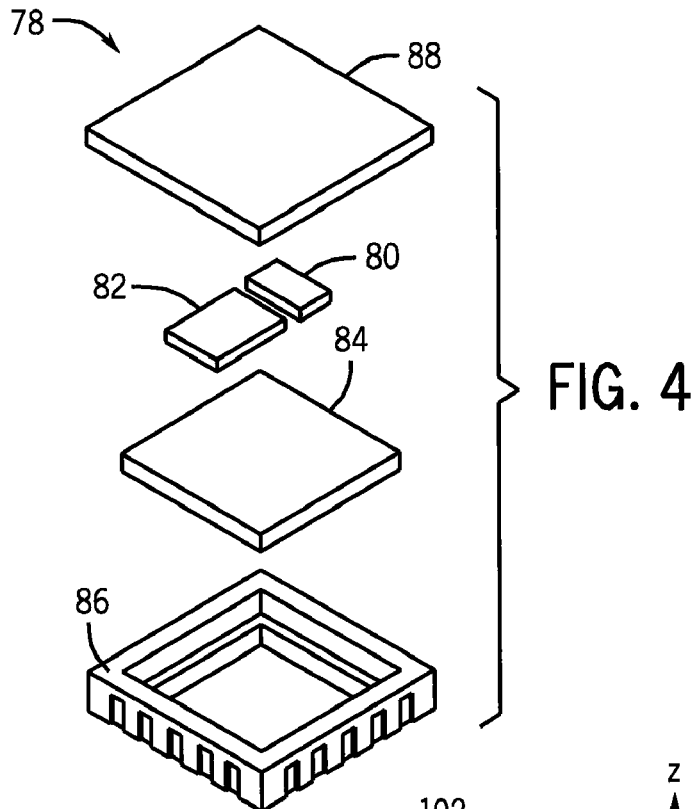
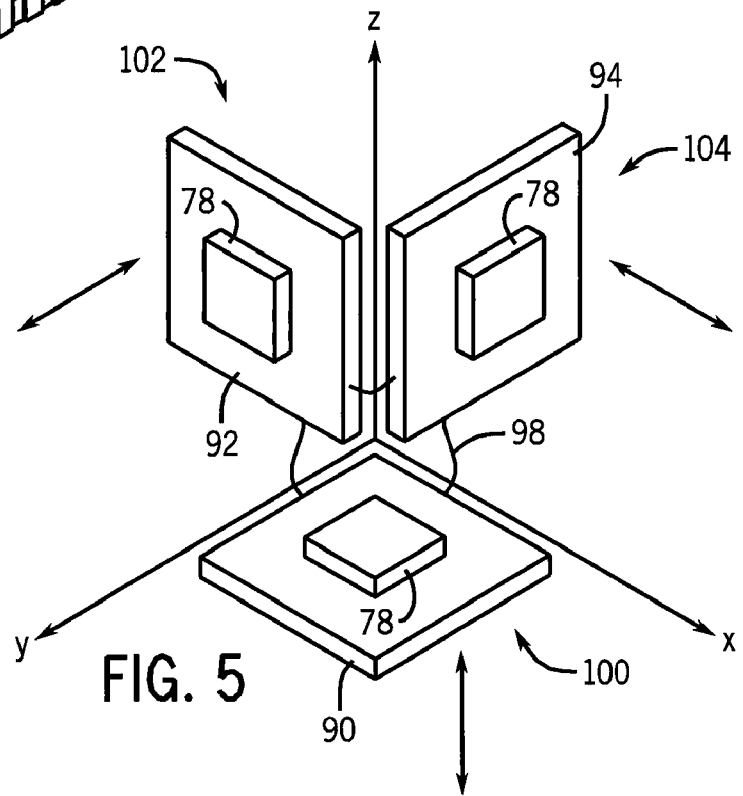

Videal($g_j$) ———

Videal($g_j$) ———
VXmeasured($g_j$, 0, 0) - - -
VYmeasured(0, $g_j$, 0) -·-·-
VZmeasured(0, 0, $g_j$) -··-

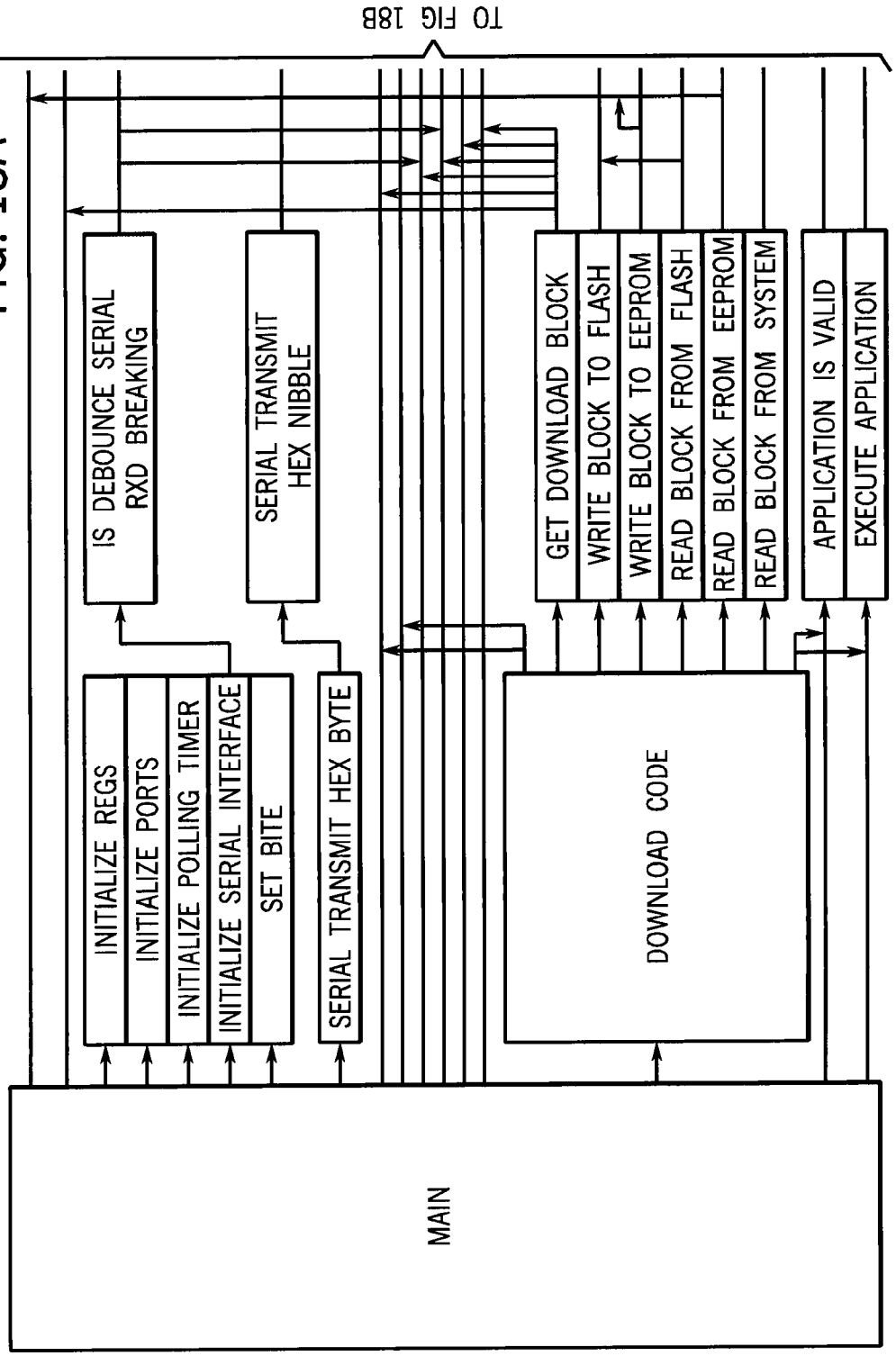

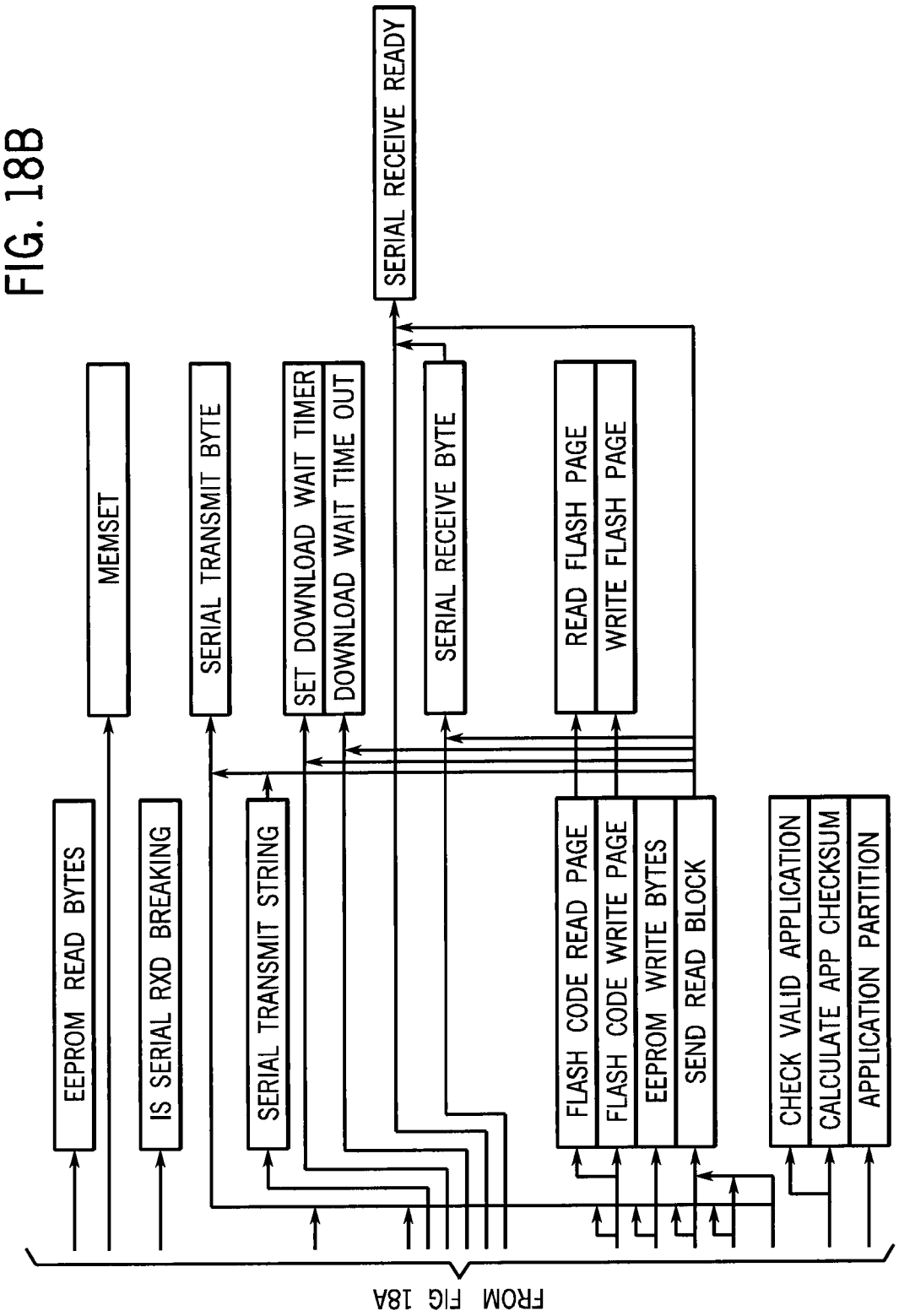

ACCELEROMETER AND METHOD FOR ERROR COMPENSATION

FIELD OF THE INVENTION

The present invention relates in general to accelerometers and, more particularly, for an improved method and apparatus for a 3-axis accelerometer.

BACKGROUND OF THE INVENTION

Many aircraft are required to have on-board flight recorders such as flight data recorders (FDRs), cockpit voice recorders (CVRs), and video recorders. Popularly known as the black box used for aircraft mishap or accident analysis, these units are also used to study air safety issues, material degradation, unsafe flying procedures, and jet engine performance.

In many airline accidents, or other aircraft accidents, the only systems that survive in a usable form are the crash-survivable memory units (CSMUs) of these flight recorders. The flight data recorder uses the CSMU to record specific aircraft performance parameters, such as airspeed, altitude, vertical acceleration, time, magnetic heading, control-column position, rudder-pedal position, control-wheel position, horizontal stabilizer, and fuel flow. In order to record these parameters, the physical conditions associated with each parameter must first be sensed. One of the sensors which are part of the flight recorder system is an accelerometer, or more particularly, a 3-axis accelerometer which can sense acceleration in three orthogonal axes: vertical axis (parallel with the gravity vector), lateral axis, and longitudinal axis.

An example of a known accelerometer used in flight recorder systems includes acceleration sensors which have pendulum weights suspended in fluids, with associated electronics and magnetics. These devices are fairly intricate in their mechanical detail, and are therefore relatively expensive to manufacture; and because they include fluids, they are not truly solid state and consequently have problems relative to reliability.

Solid state acceleration micro-electro-mechanical systems (MEMS) sensors are known which include the integration of mechanical elements and electronics on a common silicon substrate through microfabrication technology. While the electronics are fabricated typically using integrated circuit (IC) process sequences, e.g., CMOS, bipolar, or BICMOS processes, the micromechanical components are fabricated using compatible micromachining processes, or other processes such as electroplating, that selectively etch away parts of the silicon wafer or add new structural layers to form the mechanical and electromechanical devices.

Such devices are described in U.S. Pat. No. 6,000,287 and typically include a sense element chip, interface electronics chip, blank substrate, ceramic chip carrier, and a cover enclosing the sense element chip, interface electronics, and substrate. These acceleration sensors use a capacitance bridge to sense capacitance change due to acceleration. In addition to being more reliable than the pendulum weights in fluid type acceleration sensor, such a capacitive approach allows several benefits when compared to the piezoresistive acceleration sensors. Such gaseous dielectric capacitors are relatively insensitive to temperature. The low thermal coefficient of expansion of many materials can produce a thermal coefficient of capacitance about two orders of magnitude less than the thermal coefficient of resistivity of doped silicon. Capacitance sensing therefore has the potential to provide a wider temperature range of operation, for a given error and without compensation, than piezoresistive sensing. Also, as compared with piezoelectric type accelerometers which require a dynamic input of some minimum frequency to generate a response, some capacitive sensing devices allow for response to DC accelerations, as well as dynamic vibration, which allows the capacitive accelerometer to be used potentially in a wider range of applications.

MEMS acceleration sensors have some of their own challenges. For example, there can be alignment errors between the sense element chip and blank substrate, between the blank substrate and ceramic chip carrier, between the ceramic chip carrier and circuit board on which it is mounted, and between the circuit board and board mount. For a 3-axis accelerometer, having an acceleration sensor sensing acceleration in each of three axes (vertical, lateral, longitudinal), these misalignments can affect the accuracy of a reading. For example, a strictly vertical acceleration should be indicated by the vertical acceleration sensor only; however, the misalignment of the accelerometer can cause the other acceleration sensors to sense a lateral acceleration, and a longitudinal acceleration, whose magnitudes depend on the amount and direction of the misalignment in the corresponding axes.

Other errors can occur in accelerometers, such as temperature effects and electronic offset. These errors are not restricted to MEMS acceleration sensors but can be found in some degree in other types of accelerometers such as piezo-film or piezoelectric sensor/acceleration transducers, suspended cantilever beam or proof mass, also known as seismic mass, shear mode accelerometer, thermal, bulk micromachined capacitive, bulk micromachined piezo resistive, capacitive spring mass based, electromechanical servo, null-balance, strain gauge—PCB piezotronics, resonance, magnetic induction, optical, surface acoustic wave (SAW), and laser accelerometers.

What is needed in the art is an improved accelerometer method and apparatus with error compensation.

SUMMARY OF THE INVENTION

In one embodiment, the present invention is an accelerometer comprising an acceleration transducer producing uncorrected analog acceleration signals representing vertical, lateral, and longitudinal components of acceleration and an error correction system connected to the acceleration transducer for receiving the uncorrected analog acceleration signals. The error correction system includes a system controller for generating a plurality of correction coefficients, an analog to digital converter which converts the uncorrected analog acceleration signals to uncorrected digital acceleration signals, an error compensation circuit receiving the correction coefficients to compensate the uncorrected digital acceleration signals and produce corrected digital acceleration signals.

In another embodiment, the present invention is an accelerometer-based system comprising a flight recorder and an acceleration transducer connected to the flight recorder. The acceleration transducer produces uncorrected analog acceleration signals representing vertical, lateral, and longitudinal components of acceleration. An error correction system is connected to the acceleration transducer for receiving the uncorrected analog acceleration signals. The error correction system includes a system controller for generating a plurality of correction coefficients, an analog to digital converter which converts the uncorrected analog acceleration signals to uncorrected digital acceleration signals, an error compensation circuit receiving the correction coefficients to compensate the uncorrected digital acceleration signals and produce corrected digital acceleration signals.

In another embodiment, the present invention is an accelerometer comprising an acceleration transducer producing uncorrected acceleration signals and an error correction system connected to the acceleration transducer for receiving the uncorrected acceleration signals. The error correction system includes a system controller for generating a plurality of correction coefficients and an error compensation circuit receiving the correction coefficients to compensate the uncorrected acceleration signals and produce corrected acceleration signals.

In another embodiment, the present invention is a method of compensating for errors in an accelerometer comprising the steps of providing an acceleration transducer producing uncorrected analog acceleration signals representing vertical, lateral, and longitudinal components of acceleration, generating a plurality of correction coefficients, converting the uncorrected analog acceleration signals to uncorrected digital acceleration signals, and compensating the uncorrected digital acceleration signals with the correction coefficients to produce corrected digital acceleration signals.

BRIEF DESCRIPTION OF THE DRAWINGS

FIG. 4 illustrate further details of a MEMS capacitive acceleration sensor;

FIG. 5 is a perspective view of three orthogonally mounted acceleration transducers used in an accelerometer;

FIGS. 18A-18B are block diagrams of a boot loader partition for the software.

DETAILED DESCRIPTION OF THE DRAWINGS

The present invention is described in one or more embodiments in the following description with reference to the Figures, in which like numerals represent the same or similar elements. While the invention is described in terms of the best mode for achieving the invention, it will be appreciated by those skilled in the art that it is intended to cover alternatives, modifications, and equivalents as may be included within the spirit and scope of the invention as defined by the appended claims and their equivalents as supported by the following disclosure and drawings.

Figure 1:
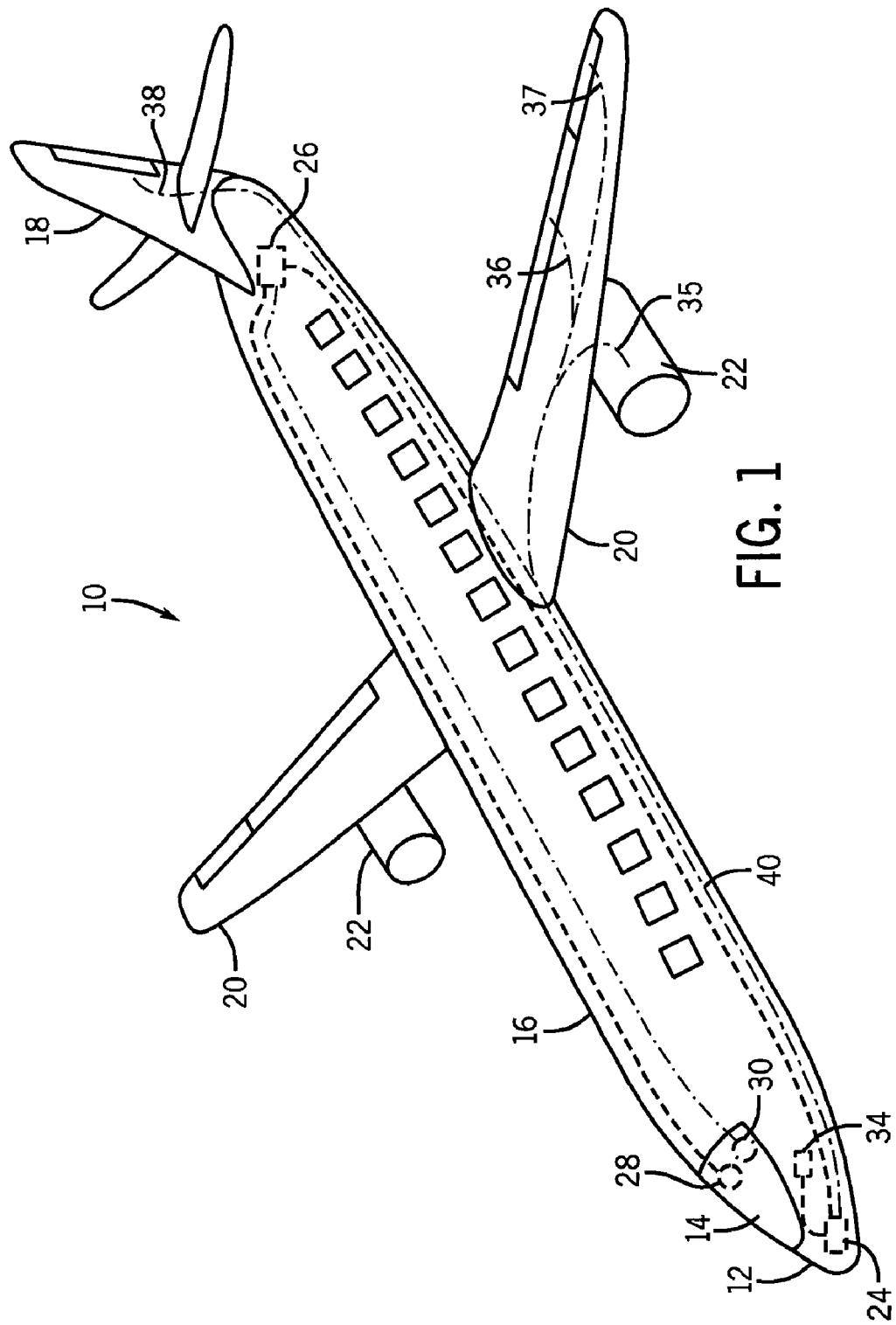
FIG. 1 illustrates an aircraft with a flight recorder system having an accelerometer.

Referring now to the drawings, and more particularly to FIG. 1, there is shown an aircraft 10 which generally includes a nose section 12, cockpit 14, fuselage 16, tail section 18, wings 20, and engines 22. Fuselage 16 includes an airframe with many components. A flight data acquisition unit 24 can be positioned in nose 12, or other locations, to acquire flight information such as air speed, altitude, vertical acceleration, time, magnetic heading, control-column position, rudder-pedal position, control-wheel position, wing flap position, horizontal stabilizer, fuel flow, and landing gear position from corresponding sensors throughout aircraft 10. Flight data acquisition unit 24 can be connected to flight recorder 26 which is discussed in more detail below. Flight recorder 26 can be connected to microphone 28, or other types of sound sensors, for the recording of sound data such as crew and passenger conversations. Similarly, flight recorder 26 can be connected to camera 30, or other types of video sensors, for the recording of video data such as crew and passenger actions. Although microphone 28 and camera 30 are shown as being positioned in cockpit 14, they can alternatively be located in a variety of positions within, or outside of, aircraft 10 such as the main cabin area, cargo hold, and landing gear compartment.

Other examples of sensors and their locations include an engine speed sensor 35, wing flap position sensor 36, aileron position sensor 37, and rudder position sensor 38. Sensors 34-38 can be connected to flight data acquisition unit 24 through a main fly-by-wire data bus 40 or by wireless channel. Although microphone 28 and camera 30 are shown as being directly connected to flight recorder 26, they can alternatively be connected to flight recorder 26 via data bus 40 or by wireless communication.

Figure 2:
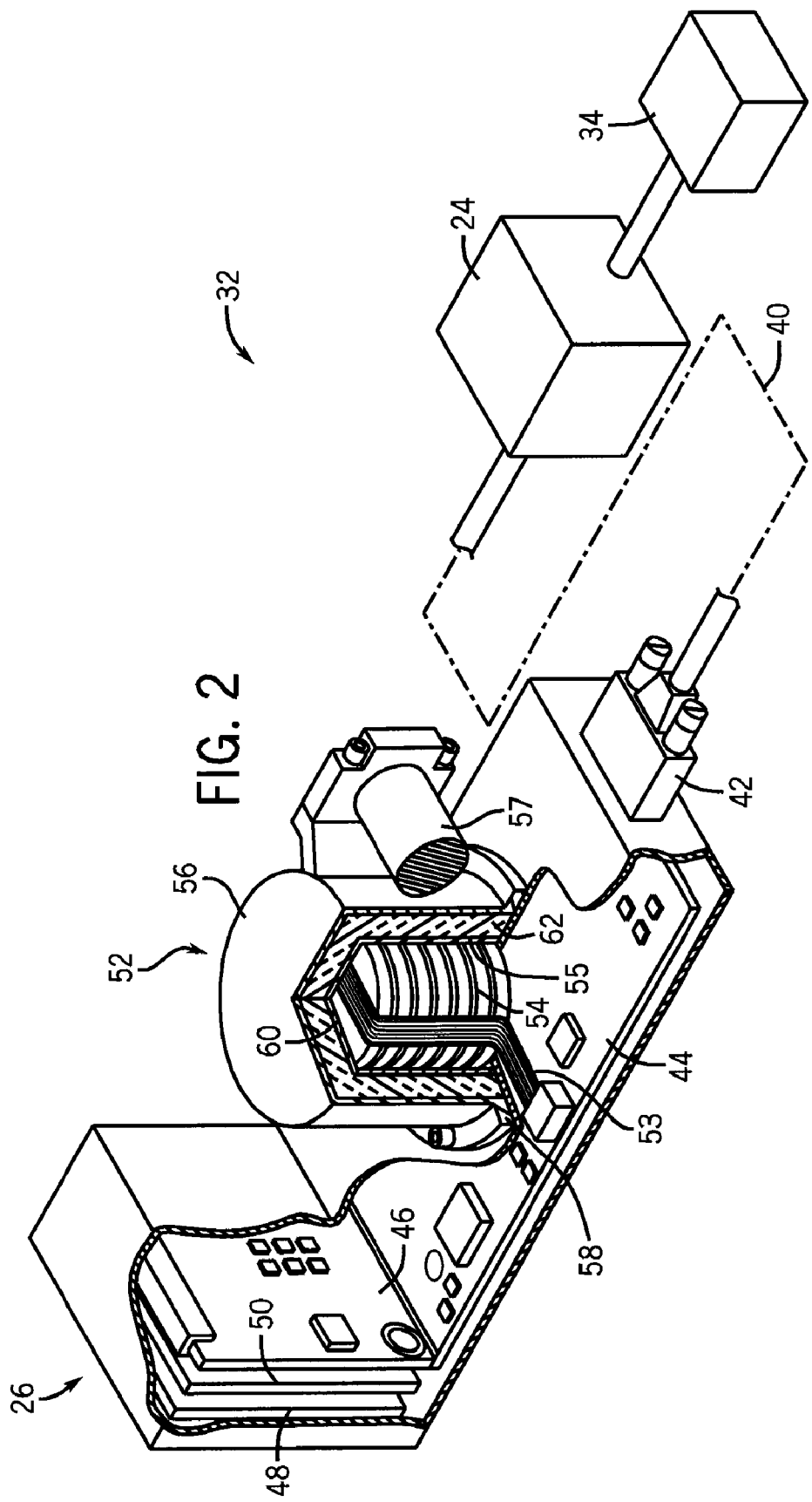
FIG. 2 is a perspective cut-away view of the flight recorder of FIG. 1.

Referring now to FIG. 2, aircraft 10 can include a flight recorder system 32 having an accelerometer 34, flight data acquisition unit 24, and flight recorder 26. Flight recorder 26 is depicted as a combined flight data recorder, voice recorder, and video recorder. Alternatively, these functions can be separated into three individual units including an individual flight data recorder, individual voice recorder, and individual video recorder. Flight recorder 26 can include an information input device such as connector 42 which receives information from any of the aforementioned, or other, sensors, microphone 28, camera 30, flight data acquisition unit 24, and data bus 40. Connector 42 can be connected to acquisition processor board 44, which can be connected to audio compression board 46, video compression board 48, and aircraft interface board 50. A crash survivable memory unit (CSMU) 52 is connected to boards 44, 46, 48, 50 via memory interface cable 53. Flight recorder 26 can further include a board housing 55, and an underwater beacon 57, or other beacon, to aid in the retrieval of flight recorder 26 in the event of a crash or other calamity.

CSMU 52 includes a heat sensitive device which can be in the form of non-volatile memory unit 54 which retains the flight information stored therein in the event of a crash or other loss of power event. Non-volatile memory unit 54 is depicted as a stack of memory cards having computer memory chips thereon; however, non-volatile memory unit 54 can include other memory technologies such as magnetic, optical, as well as other memory technologies. CSMU 52 is electrically connected to information input device 42.

CSMU 52 can include a housing 56 at least partially enclosing non-volatile memory unit 54. In one embodiment, housing 56 is made of an outer protective material 58, such as stainless steel, and an inner protective material 60, such as aluminum. Insulating material 62 can provide more thermal protection for memory unit 54. High temperature insulating material 62 can be a dry-silica material or other high temperature insulation.

Figure 3:
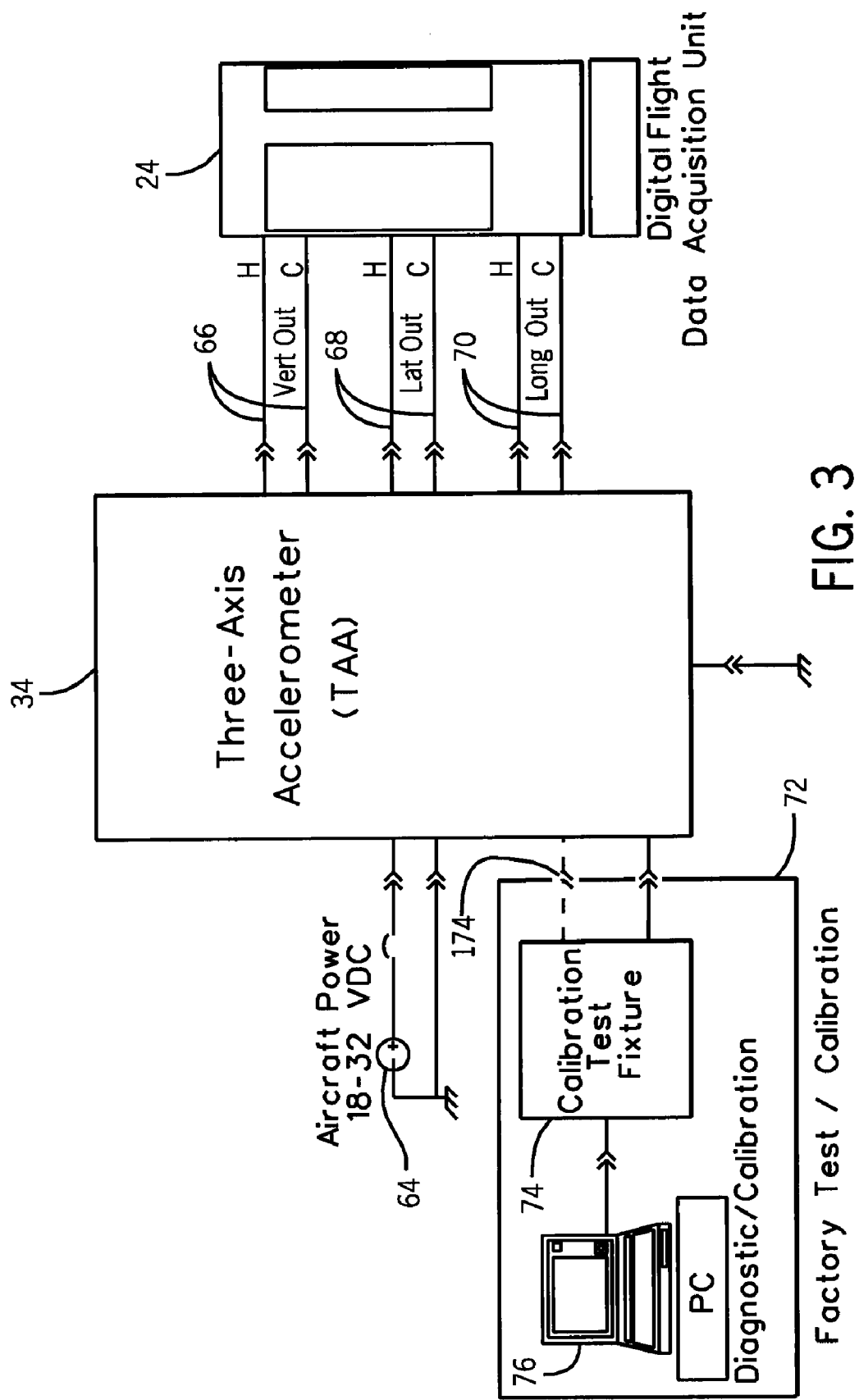
FIG. 3 is a block diagram of the accelerometer of FIG. 2 in a calibration/manufacturing environment and an operational environment.

Accelerometer 34 is shown in block diagram form in FIG. 3. When installed in aircraft 10, accelerometer 34 is connected to aircraft power 64, and flight data acquisition unit 24. Accelerometer 34 is depicted as a 3-axis accelerometer. For the embodiment of FIG. 3, accelerometer 34 provides vertical acceleration output 66, lateral acceleration output 68, and longitudinal acceleration output 70 which are measures of the respective accelerations sensed by accelerometer 34 to flight data acquisition unit 24. Prior to installation in aircraft 10, accelerometer 34 is connected to test and calibration system 72.

Test and calibration system 72 can include a variety of calibration test fixtures 74 for applying test conditions to accelerometer 34. Diagnostic/calibration computer 76 can be used to control and monitor various test conditions. Test and calibration system 72 assists in the calculation of various correction coefficients, although, in the embodiment shown, the correction coefficients are specifically calculated by accelerometer 34. Test and calibration system 72 is disconnected from accelerometer 34 prior to installing accelerometer 34 in aircraft 10.

FIGS. 4 and 5 illustrate some of the mechanical packaging aspects of the acceleration sensor/transducers 78. A typical acceleration sensor/transducers 78 can include a capacitive sense element chip 80, interface electronics chip 82, blank substrate 84, ceramic chip carrier 86, and cover 88 enclosing the sense element chip 80, interface electronics 82, and substrate 84. In the embodiment shown, sense element chip 80 can be a capacitive MEMS device similar to that disclosed in the U.S. Pat. No. 6,000,287.

Acceleration sensor/transducers 78 can be mounted on a respective circuit board 90, 92, and 94, which may include other interface electronics, and which are orthogonally configured on mount 98. Referring to FIG. 5, and using a convention of the Z-direction being vertical, the X-direction being longitudinal, and the Y-direction being lateral, and when so configured, element 100 has a positive vertical acceleration transducer, element 102 has a negative lateral acceleration transducer, and element 104 has a negative longitudinal acceleration transducer.

Figure 6A:
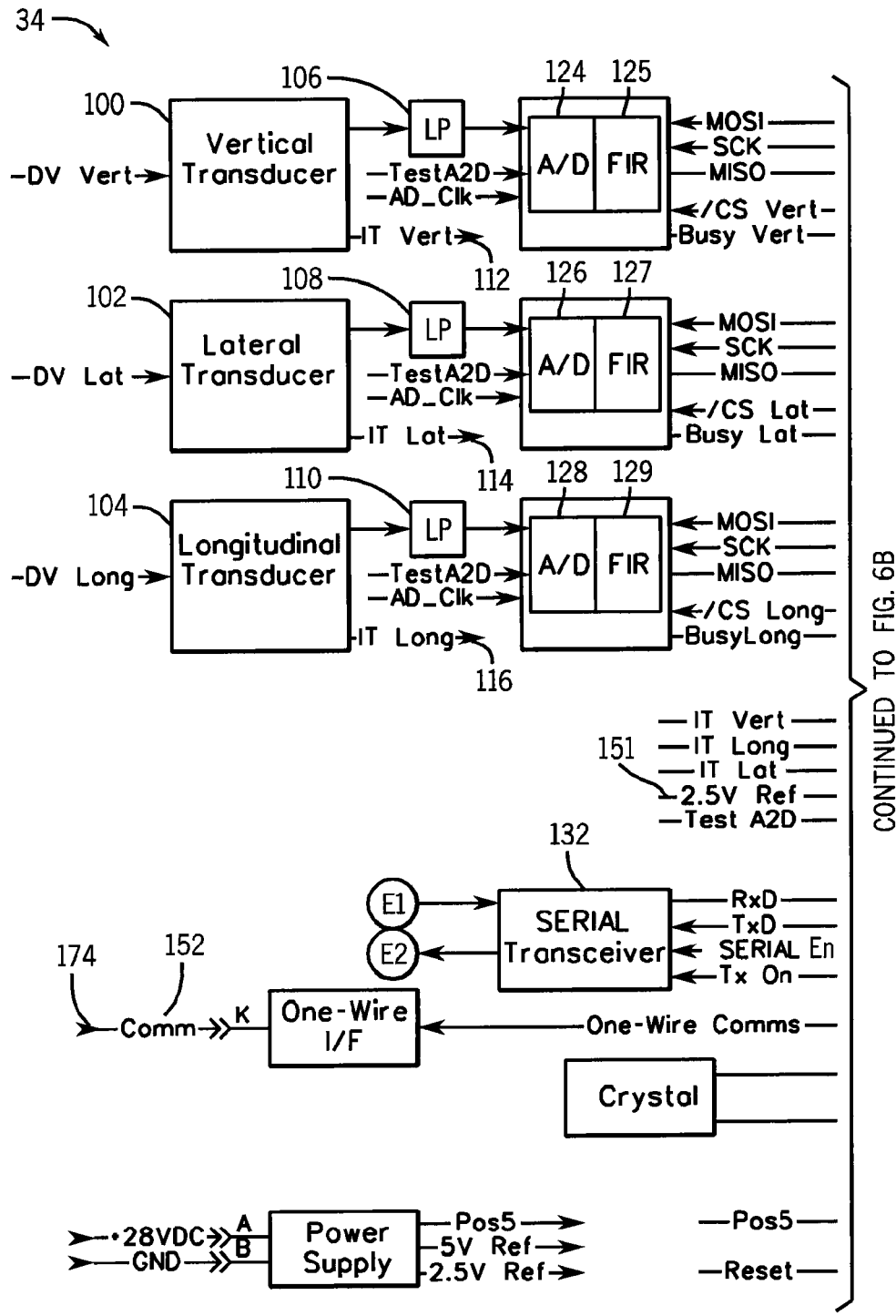
FIGS. 6A-6C is a block diagram of the accelerometer.
Figure 6B:
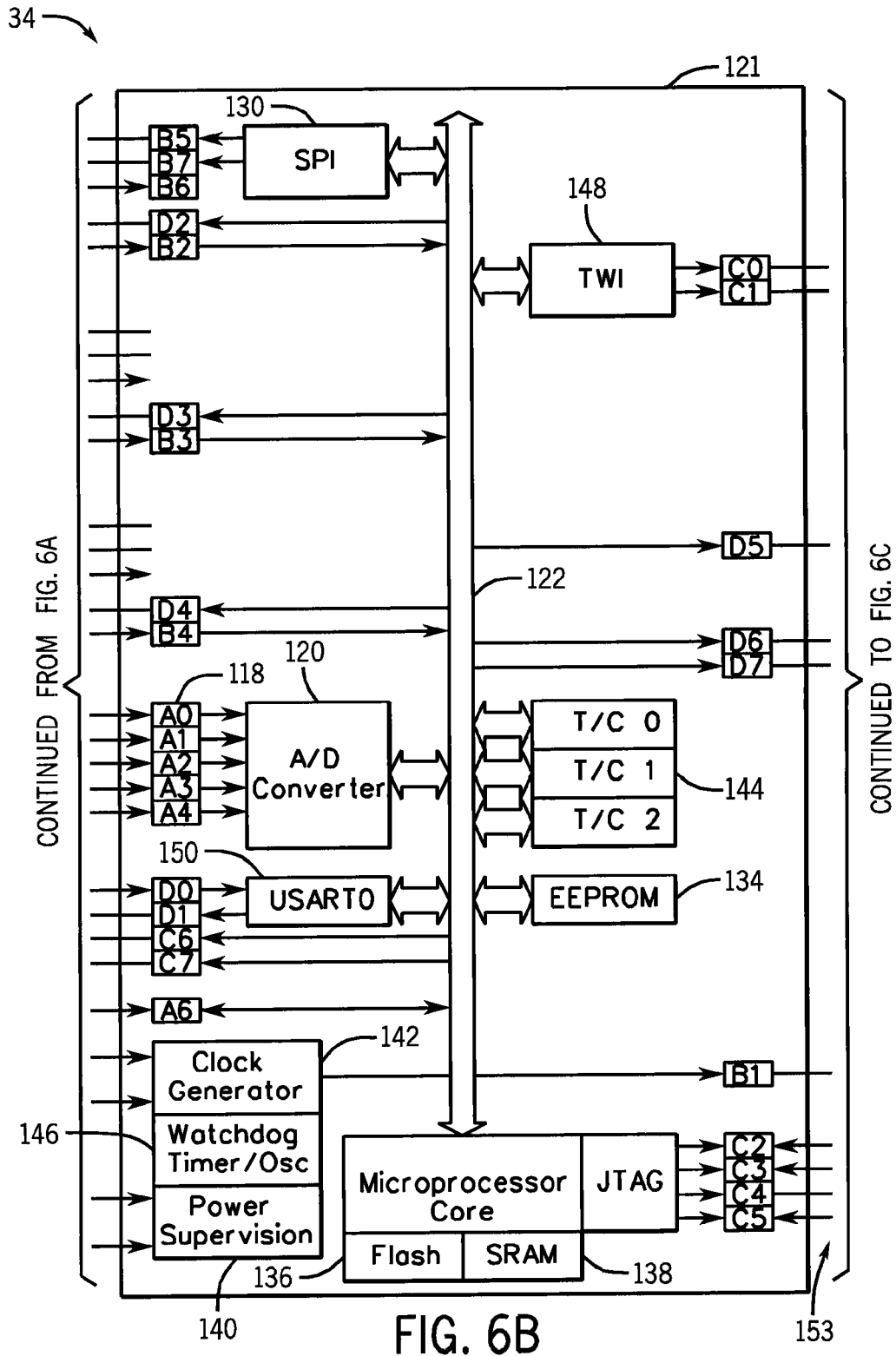
Figure 6C:
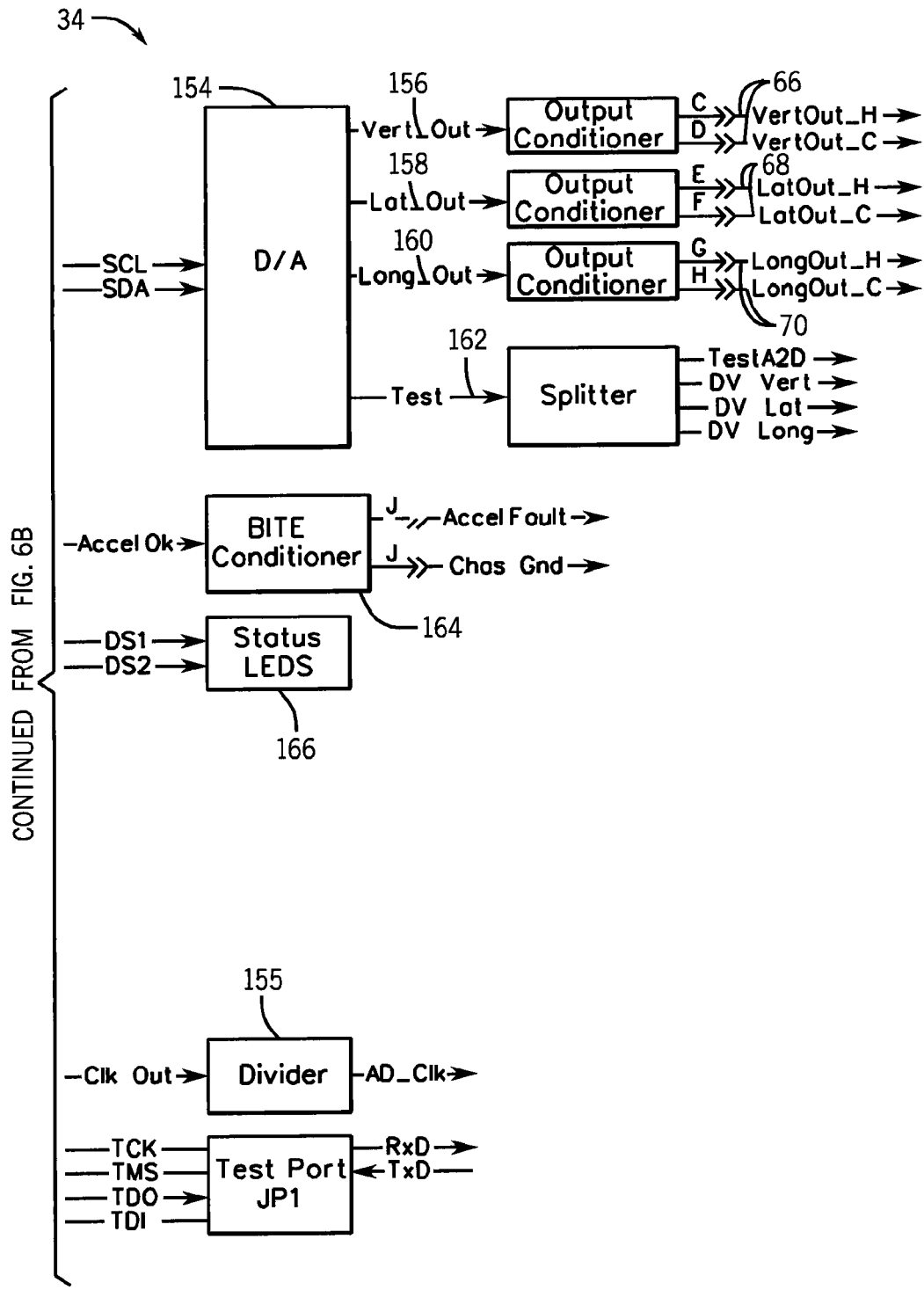

A more detailed block diagram of accelerometer 34 is given in FIGS. 6A-6C. Transducer 34 integrates three MEMS 78 with an application specific signal processor (ASSP) 121 and calibration memory 134, 136, 138. The integrated package provides a calibrated, high-accuracy, linear interface to aircraft instrumentation systems. All corrections for sensor errors due to offsets, non-linearities, and temperature drift are handled by ASSP processor 121. Accelerometer 34 accepts aircraft power (28 volts) as an input and provides a 0.2-5V analog output for each axis (vertical, lateral and longitudinal). Acceleration transducers 100, 102, 104 provide uncorrected acceleration signals at 106, 108, 110, respectively. Acceleration transducers 100, 102, 104 also provide respective temperature signals 112, 114, 116 from temperature sensors which are typically part of interface electronic chip 82. Temperature signals 112, 114, 116 are provided to multiplexer 118, then to analog to digital (A/D) converter 120 and bus 122 of ASSP processor 121. The ASSP processor can be a 8-bit microcontroller with 64 Kb of programmable flash memory. Many other types of processors/microcontrollers, ASICs, field programmable gate arrays, and electronic logic/memory devices can also be used.

Uncorrected acceleration signals 106, 108, 110 are first conditioned with a presample, low-pass filter and then routed to respective A/D converters 124, 126, 128, to provide a digitized sample. These samples are provided to the respective finite impulse response (FIR) filters 125, 127, 129, which can be over-sampling decimation filters combined with A/D converters 124, 126, 128, then to serial peripheral interface 130 of ASSP processor 121. Serial transceiver 132 can be used to communicate with diagnostic/calibration computer 76 in which the correction coefficients are calculated and applied within ASSP processor 121, bus 122, and other elements of accelerometer 34.

For example, the correction coefficients which are calculated during the test/calibration phase are stored in electrically erasable programmable read only memory (EEPROM) 134, whereas the program instructions for calculating the correction coefficients are stored in flash memory 136, and intermediate variables, program data and other data stack information are stored in static random access memory (SRAM) 138. Although computer readable mediums 134, 136, 138 are described as being EEPROM, flash and SRAM memory types, they could also include other electrical, magnetic, and optical memory devices. Some of the other embedded peripherals of ASSP processor 121 include: power supervision unit 140 for power-up reset and brown-out monitoring, clock generator 142 for frequency control, three timer/counters (T/C) 144 for timing control, watchdog timer 146 for software error recovery, SPI 130 and two wire interface (TWI) 148 for accessing serial devices, universal asynchronous receiver transmitter (USART0) 150 for PC 76 communications, and A/D converter 120 for monitoring respective transducers 100, 102, 104 temperature signals 112, 114, 116 and reference voltage 151.

The system interfaces include peripherals embedded on ASSP processor 121 as have been described, along with other software controllable devices. In addition, there is an external communication interface 152 to PC 76 for test and calibration, along with a JTAG port 153 for software development and programming. The software controllable devices include: a divider 155 for generating the A/D sample rate, three A/D converters 124, 126, 128 with integral FIR decimation filters 125, 127, 129 for sampling the vertical, lateral, and longitudinal transducers 100, 102, 104, along with reference voltages, a 4-channel digital-to-analog (D/A) converter 154 for generating corrected output signals 156, 158, 160, and corresponding conditioned/corrected output signals 66, 68, 70 which are fed to flight data acquisition unit 24 for respective vertical, lateral, and longitudinal axes, along with a test deflection voltage 162, serial transceiver 132 for PC 76 communications, and built in test (BITE) device 164 and LED status indicator 166.

ASSP processor 121 handles software controlled functions. Accelerometer 34 also includes the three FIR coprocessors 125, 127, 129 which can be integral to the A/D converters 124, 126, 128, one for each transducer axis. FIR coprocessors 125, 127, 129 provide a decimation filter function upon the transducer data samples. ASSP processor 121 implements an additional FIR low-pass filter implemented in software that can have a passband of 4 Hz. The frequency response of the low-pass filters is selectable by controlling the A/D sample clock, setting the over sample ratio register in the device, and coefficient tables programmed into ASSP processor 121.

Figure 7:
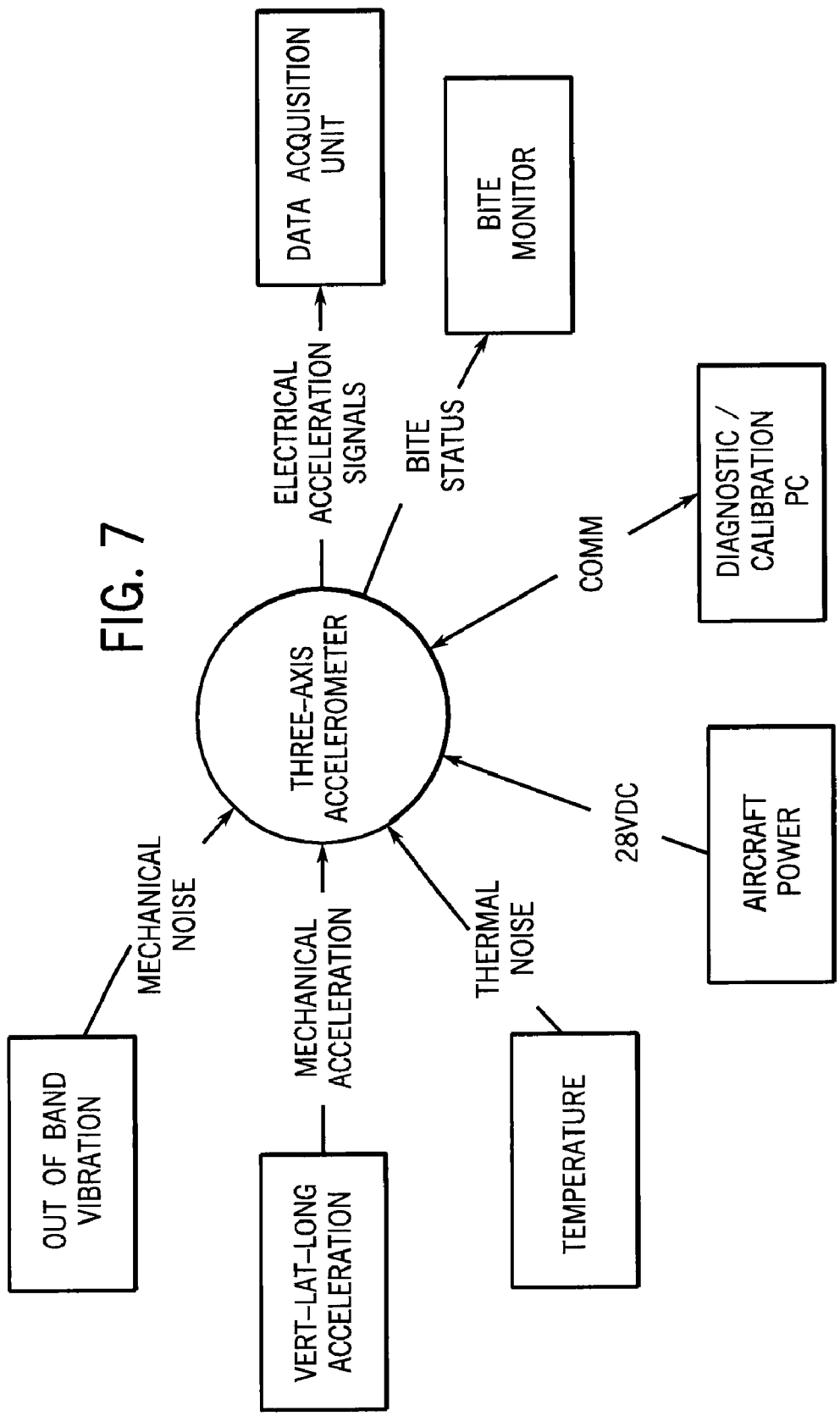
FIG. 7 is a context block diagram of the accelerometer.

FIG. 7 shows a top level context diagram of accelerometer 34 interacting with its environment. Accelerometer 34 is shown as a three-axis accelerometer (TAA) that transforms mechanical acceleration into electrical signals for data acquisition applications in the presence of mechanical and thermal noise, e.g., out of band vibration, vertical-lateral-longitudinal acceleration, and temperature. The TAA is energized by the aircraft power supply. A communication (COMM) port 132 is provided for calibration and diagnostics for test/manufacturing purposes only, and is not a part of the aircraft installation. A built-in test equipment (BITE) output is available for monitoring system status.

Figure 8:
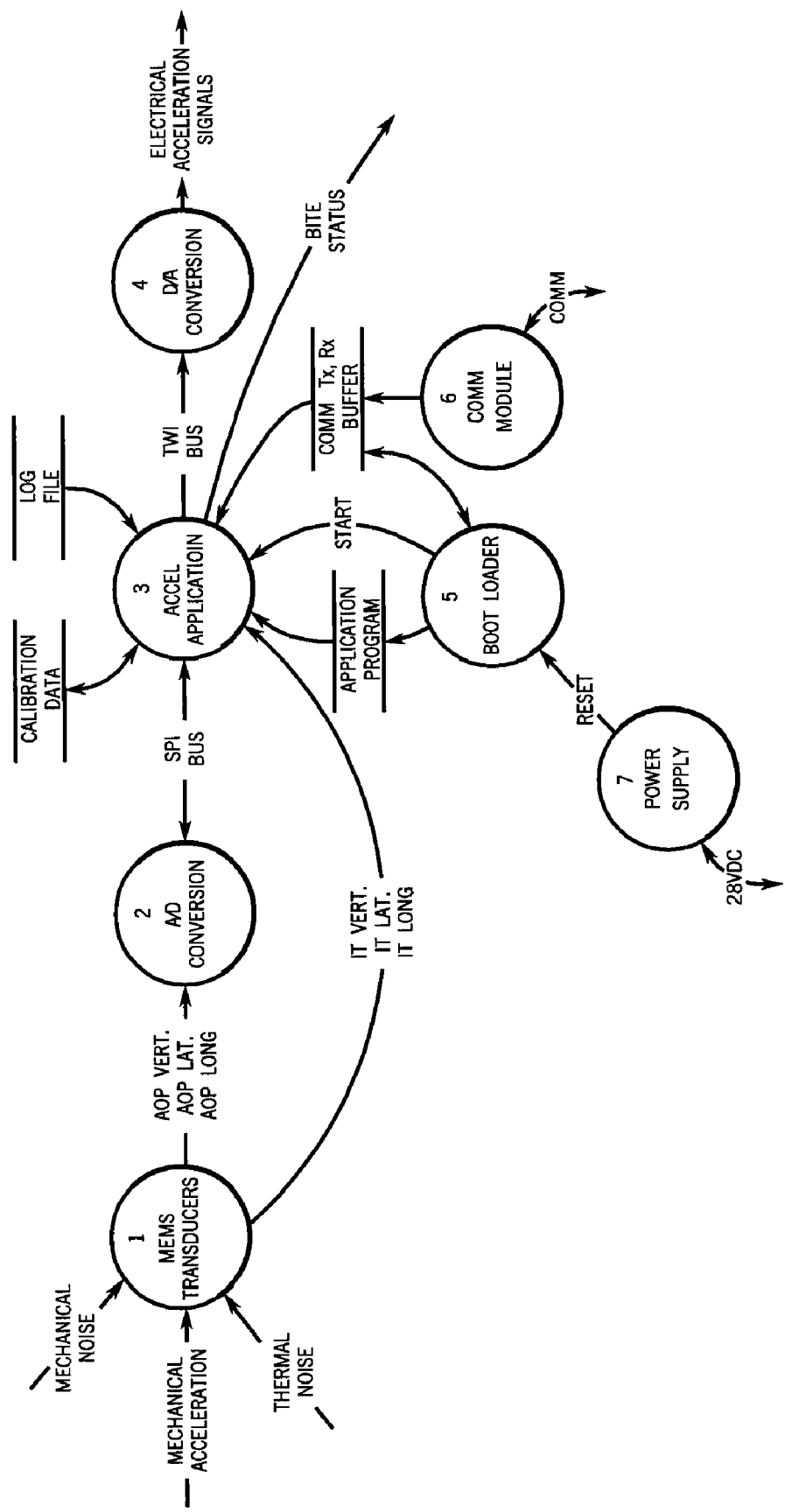
FIG. 8 is an overall data flow block diagram of the accelerometer.

FIG. 8 illustrates an implementation of control and data flow of the software/firmware/hardware using a data flow diagram. The data flow (shown as solid lines) is used to describe the movement of packets of information from one part of the system to another. The data store (shown as open boxes) is used to model a collection of steady state data packets. Terminators represent external entities with which the system interacts. A control flow is a pipeline that carries a binary signal, enabling a control process to synchronize another process. Processes may be decomposed into lower level data flow diagrams in order to show additional detail. Processes are numbered to reflect their relative position in the data flow hierarchy.

The MEMS transducers (process 1) converts the mechanical acceleration that it senses into AOP vert, lat, and long analog signals as uncorrected acceleration signals, corresponding to the signals at 106, 108, 110 in FIG. 6A. The AOP analog signals are then sampled by the A/D conversion (process 2) and transferred to the accel application (process 3) over the SPI bus, along with the transducer temperature signals, IT vert, IT lat, and IT long. The accel application combines the uncorrected acceleration signals with the temperature signals and correction factors from the calibration data store. The combination produces a compensated signal that has the external mechanical and thermal noise effects filtered out along with correction for the internal errors associated with the sense elements. Compensated samples are presented to the D/A conversion process over the TWI bus to update the system output, which is an electrical analog signal that represents the physical acceleration applied to the unit.

The accel application process provides periodic control signals to sample each input at 2048 samples per second and update each output at 128 samples per second. Interpolation is employed by the D/A conversion process to smooth-out the data.

The accel application has two basic modes of operation: maintenance/calibration mode and normal operation mode. In the maintenance/calibration mode, the correction coefficients are computed and saved in the calibration data store. In the normal operation mode, the correction coefficients are continuously applied to provide real-time corrected output acceleration signals 156, 158, and 160. The COMM module (process 6) accepts commands over the serial COMM port for factory calibration of the system. During calibration, unit 34 is subjected to a reference acceleration and temperature, which is also communicated over the COMM port and placed into the COMM Tx, Rx buffer, and subsequently accessed by the accel application. The accel application compares the reference input to the value of the current transducer measurement and computes a correction factor that is stored and subsequently accessed to perform the compensation during normal operation.

The accel application has access to the various data stores for diagnostic purposes, which is reported on the BITE status output as well as a log file data store. The boot loader (process 5) is responsible for system initialization, and other maintenance tasks associated with the COMM port such as updating firmware, represented by the application program data store. The boot loader is activated by the reset control flow provided the power supply (process 7).

Figure 9:
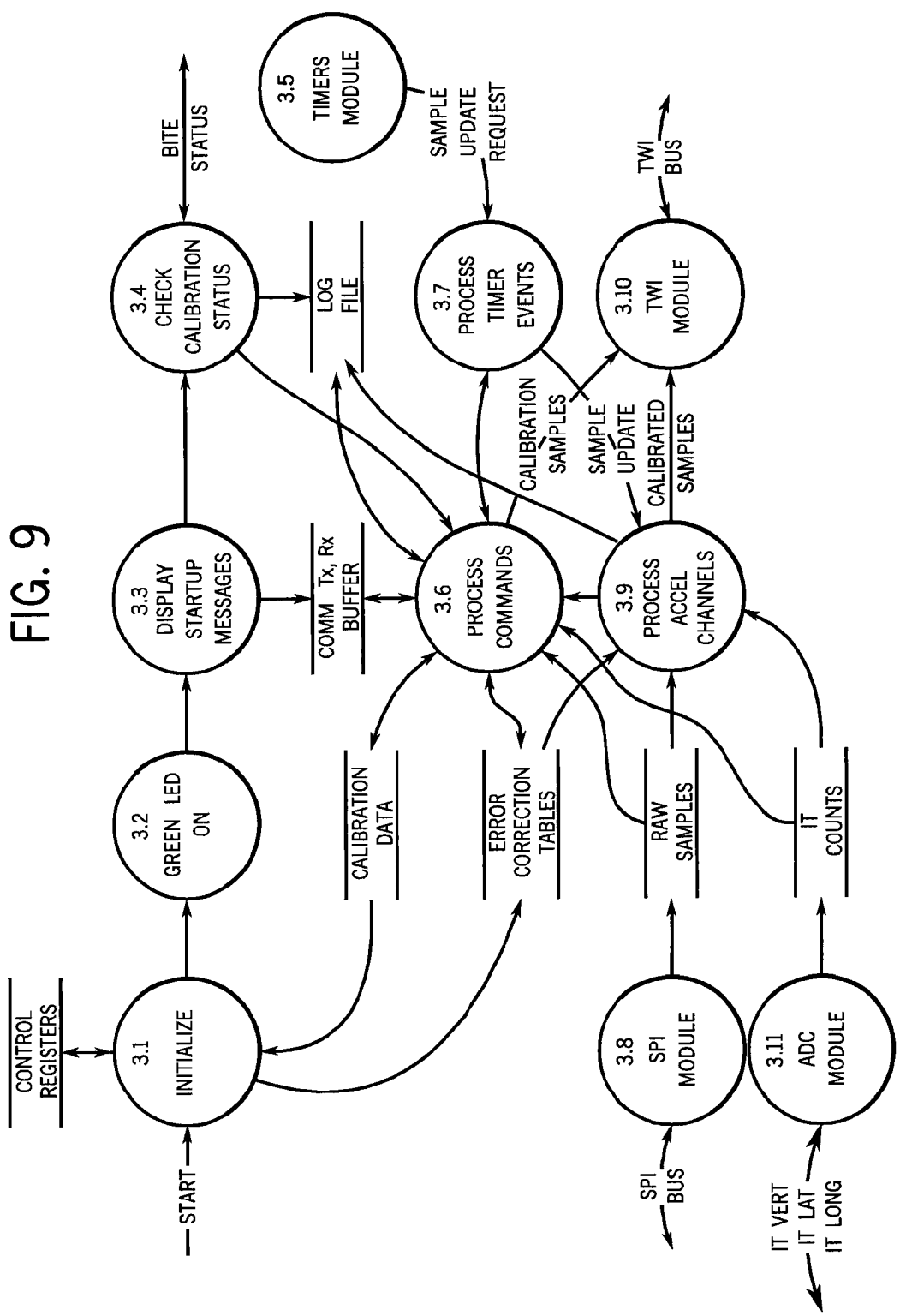
FIG. 9 is a more detailed data flow block diagram of the accel application.

Referring to FIG. 9, additional details of the accel application (process 3) data and control flow are provided. The SPI module (3.8) streams the acceleration data from the transducers into the raw sample data store via the SPI bus. The ADC module (3.11) streams the thermal data from the transducers into the IT counts data store. The TWI module (3.10) accepts either calibration samples as part of the calibration mode of operation, or calibrated samples as part of the normal mode, and provides an update of the D/A output converter via the TWI bus.

Upon reception of the start signal from the boot loader process, the initialize process (3.1) accesses the calibration data store and builds the error correction tables and sets various control registers associated with ASSP processor 121. Control then passes to the green LED on (3.2) to indicate that ASSP processor 121 has been initialized. Control then passes to the display startup messages (3.3) to post startup messages to the COMM Tx buffer. Control then passes to the check calibration status (3.4) which reports any internal problems on the BITE status output and log file. Control then passes to the main control loop composed of process commands (3.6), process timer events (3.7), and process accel channels (3.9).

Process commands handles any diagnostic/calibration commands that appear in the COMM Rx buffer. For some calibration commands, the raw samples and IT counts associated with the transducers, may be uniquely combined with reference information provided in the command. The results of the combination may be stored in the calibration data and error correction tables. Some calibration commands may set the output D/A converters with a calibration sample via the TWI bus, for verification purposes. Other commands may directly access various internal data structures, including the data stores associated with the raw samples, IT counts, calibration data, error correction tables, and log file. Such data may be formatted and presented in various, useful ways and posted to the COMM Tx buffer. Upon completion of a calibration mode command, control passes to the process timer events (3.7), which checks for a sample update request synchronization signal from the timer module (3.5). If there is no pending sample update request, control passes directly back to process commands in order to handle any additional calibration mode commands. If an update request is pending, control is first passed to the process accel channels (3.9) before looping back to process commands. Process accel channels handles the normal mode of operation, which combines the raw samples and IT counts from the transducers with the error correction tables to form calibrated samples.

Figure 10:
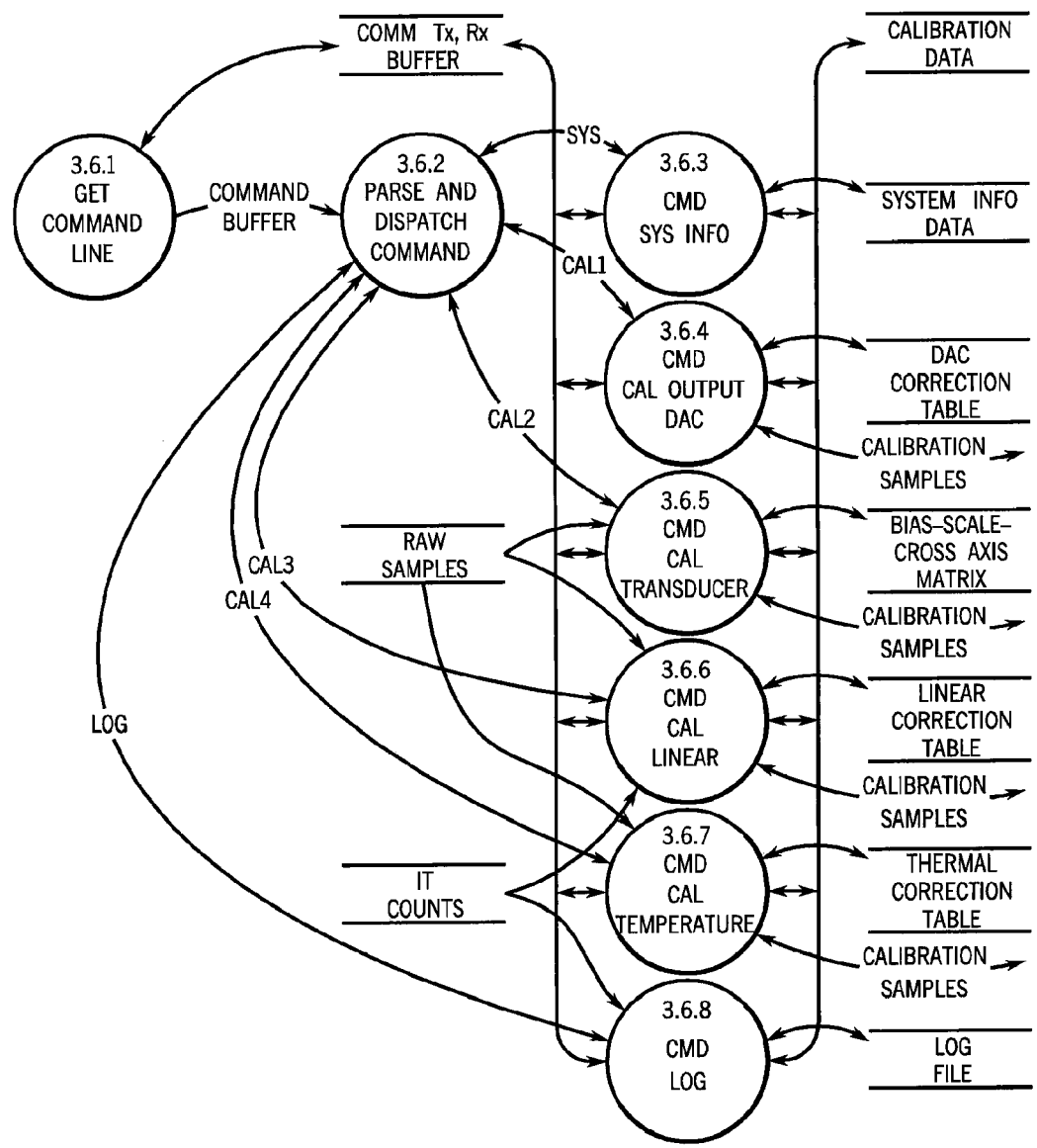
FIG. 10 is a more detailed data flow block diagram of the process commands within the accel application.

Referring to FIG. 10, additional details of the process commands (3.6) data and control flow are provided. Process 3.6.1, get command line, assembles a command buffer from characters found in the COMM Rx buffer and passes it the parse and dispatch command (3.6.2). If a SYS command is parsed, control is passed to cmd sys info (3.6.3). The SYS command provides COMM access to the system info data store, which may contain information such as serial number, date of manufacture, and date of calibration. If a call command is parsed, control is passed to cmd cal output DAC (3.6.4). The cmd cal output DAC process interactively calibrates each of the output D/A converters. Using a plurality of calibration points, selected digital output codes are generated and provided as calibration samples. For each calibration sample, an associated measurement is taken, using an external voltage meter which is part of the calibration test fixture 74 in FIG. 3. The measurement is transferred to the COMM Rx buffer and subsequently stored in the calibration data store, along with the corresponding calibration sample. The plurality of measurements and calibration samples are arranged into a table of X-Y pairs, forming the DAC correction table. The X-Y arrangement provides for a calibrated output voltage level to be precisely set using cubic spline interpolation. Cubic spline interpolation is a mathematical technique for determining the value of a dependent variable Y, for an independent variable X, given a tabulated arrangement of known X-Y pairs. The plurality of calibration measurements provide the independent variable X, while the plurality of calibration points provide the dependent variable Y, for cubic spline interpolation for purposes of output D/A calibration. If a cal2 command is parsed, control is passed to cmd cal transducer (3.6.5). The cmd cal transducer process interactively builds the bias-scale-cross axis matrix by storing calibration data for each of the six possible orientations or facings, with respect to the gravity vector. If a cal3 command is parsed, control is passed to cmd cal linear (3.6.6). The cmd cal linear process interactively calibrates for non-linearity errors associated with the transducers and supporting electronics. Using a plurality of calibration points, a linear correction table is formed. The table contains X-Y pairs of acceleration. The X-value is the G acceleration as measured by the TAA system, while the Y-value is a reference acceleration applied to unit 34 as part of calibration test fixture 74. The X-Y arrangement provides for a linear calibration of acceleration using the aforementioned technique of cubic spline interpolation. If a cal4 command is parsed, control is passed to cmd cal temperature (3.6.7). The cmd cal temperature process interactively calibrates for errors associated with thermal effects. The thermal effects are characterized by a variation in offset error over temperature for each of the transducers. The thermal offset is highly non-linear and requires compensation for its effect.

The transducers exhibit a hysteresis effect that skews the offset error, depending upon whether the change in temperature is increasing or decreasing. Hence, the offset error over several thermal cycles spanning the operational temperature range describes a thermal eye pattern. Furthermore, it takes several thermal cycles for the thermal eye to settle into a predictable and repeatable pattern. The unit is thermally seasoned by cycling the temperature over a plurality of cycles. During the thermal seasoning, the span of IT counts for each of the transducers is monitored and recorded. Once the transducer is seasoned, a plurality of calibration points is selected over the IT count span. The unit is then cycled over temperature for a plurality of cycles.

Figure 11:
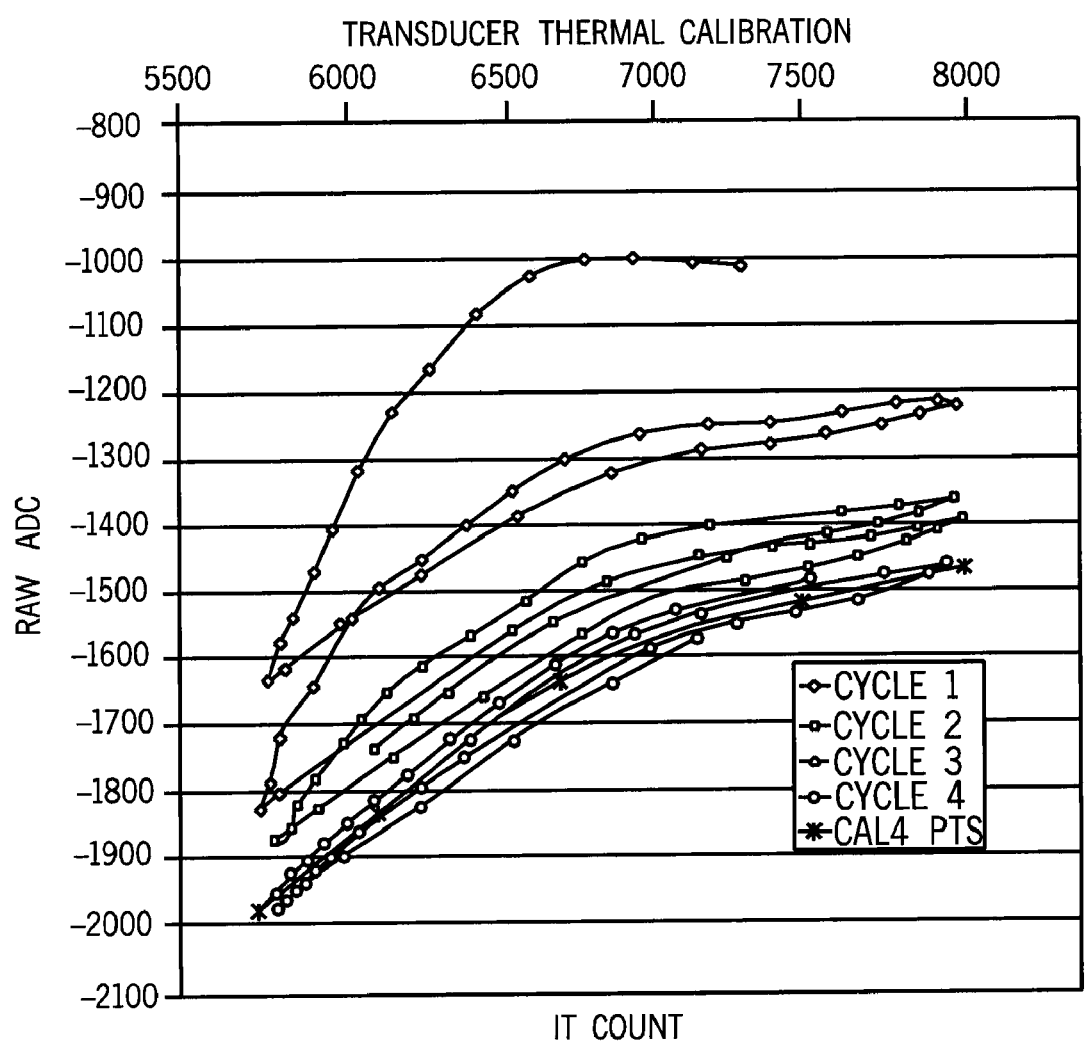
FIG. 11 is a graph of thermal calibration of the transducer.

During the temperature cycling, the IT count is monitored for points that bracket the selected calibration points. When two such points are found, linear interpolation is performed on the corresponding raw samples in order to derive an intermediate raw sample associated with the calibration point. Several such intermediate values are averaged together over a plurality of cycles in order to evenly split the thermal eye at a calibration point. These points, taken together, trace out the cal4 calibration curve, such as shown in FIG. 11. Without loss of generality, one point on the cal4 curve is arbitrarily chosen as a baseline. The baseline value is subtracted from the other points on the cal4 curve in order to determine the thermal offset error for a particular IT count. The IT count and thermal offset are tabulated into X-Y pairs and become a part of the thermal correction table. The aforementioned technique of cubic spline interpolation can be applied to the thermal correction table to compute a thermal bias correction coefficient for an arbitrary IT count.

If a LOG command is parsed, control is passed to cmd log (3.6.8). The cmd log process interactively accesses the log file to display any BITE entries. An example of one such entry can be an entry that reports the unit is subjected to a temperature that is outside the operational limits.

Figure 12:
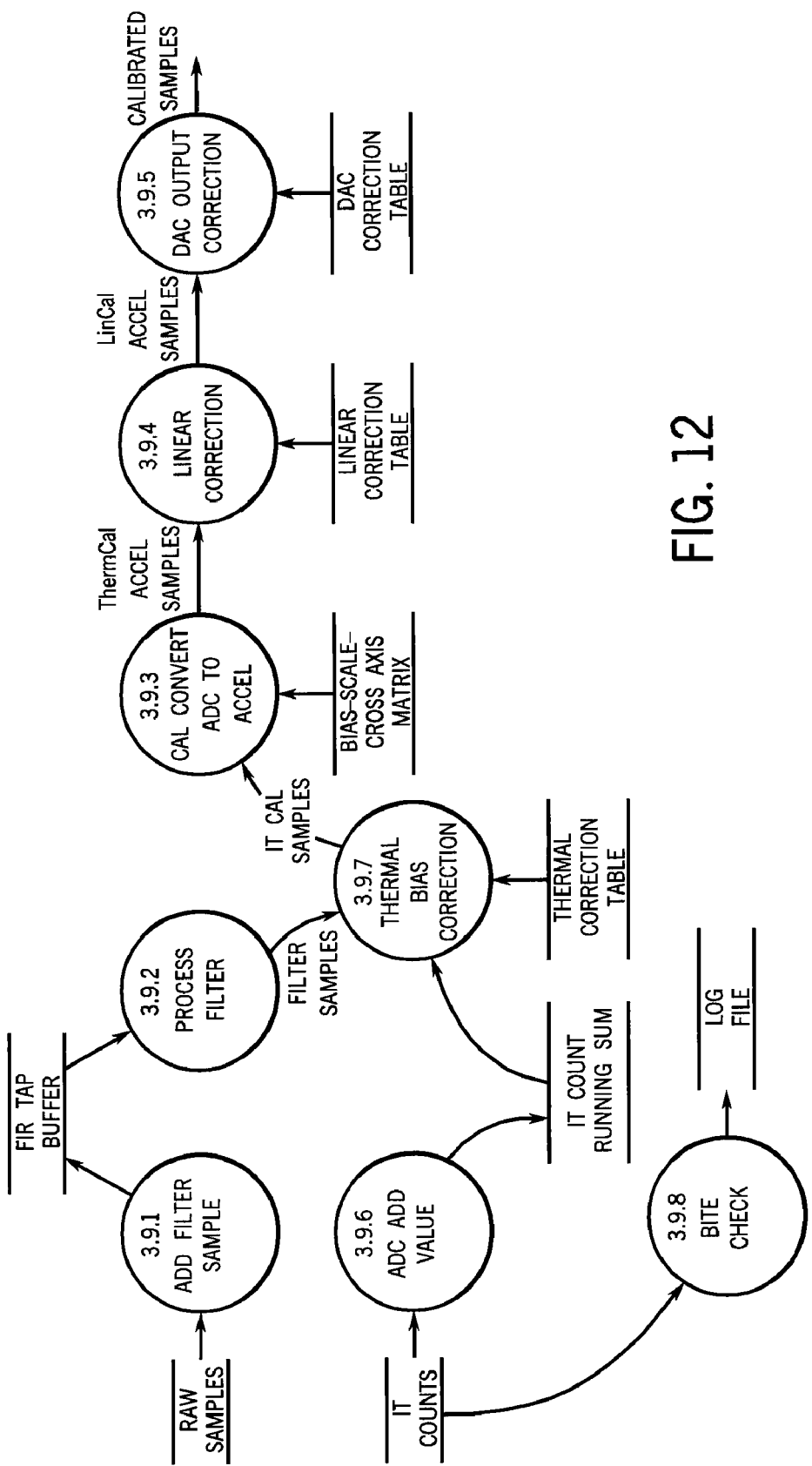
FIG. 12 is a more detailed data flow block diagram of the process accel channels within the accel application.

Referring to FIG. 12, additional details of the process accel channels (3.9) data flow are described. Out-of-band mechanical noise, e.g., vibration above a selected frequency which can be 4 Hz, is filtered out. The filtering is accomplished with a low-pass filter implemented as a FIR filter with the add filter sample (3.9.1) and process filter (3.92). The IT counts are averaged down, using the ADC add value (3.96) and IT count running sum data store. The averaging down provides an improvement to the signal-to-noise ratio for the thermal data. For each transducer channel, the current thermal value from the IT count running sum is combined with the filtered sample and thermal correction table. The combination is performed within the thermal bias correction (3.9.7), providing compensation for the thermal errors as described in the cal4 calibration. The IT cal samples are streamed into the cal covert ADC to accel (3.9.3), which applies the bias-scale-cross axis matrix determined in the cal2 calibration. The result of the matrix operation are streamed to the linear correction (3.9.4) which combines it with the linear correction table determined in the cal3 calibration. The lin cal accel sample result is streamed to the DAC output correction (3.9.5) which converts the acceleration sample into an output voltage level and applies the DAC correction table determined in the call calibration.

Figure 13:
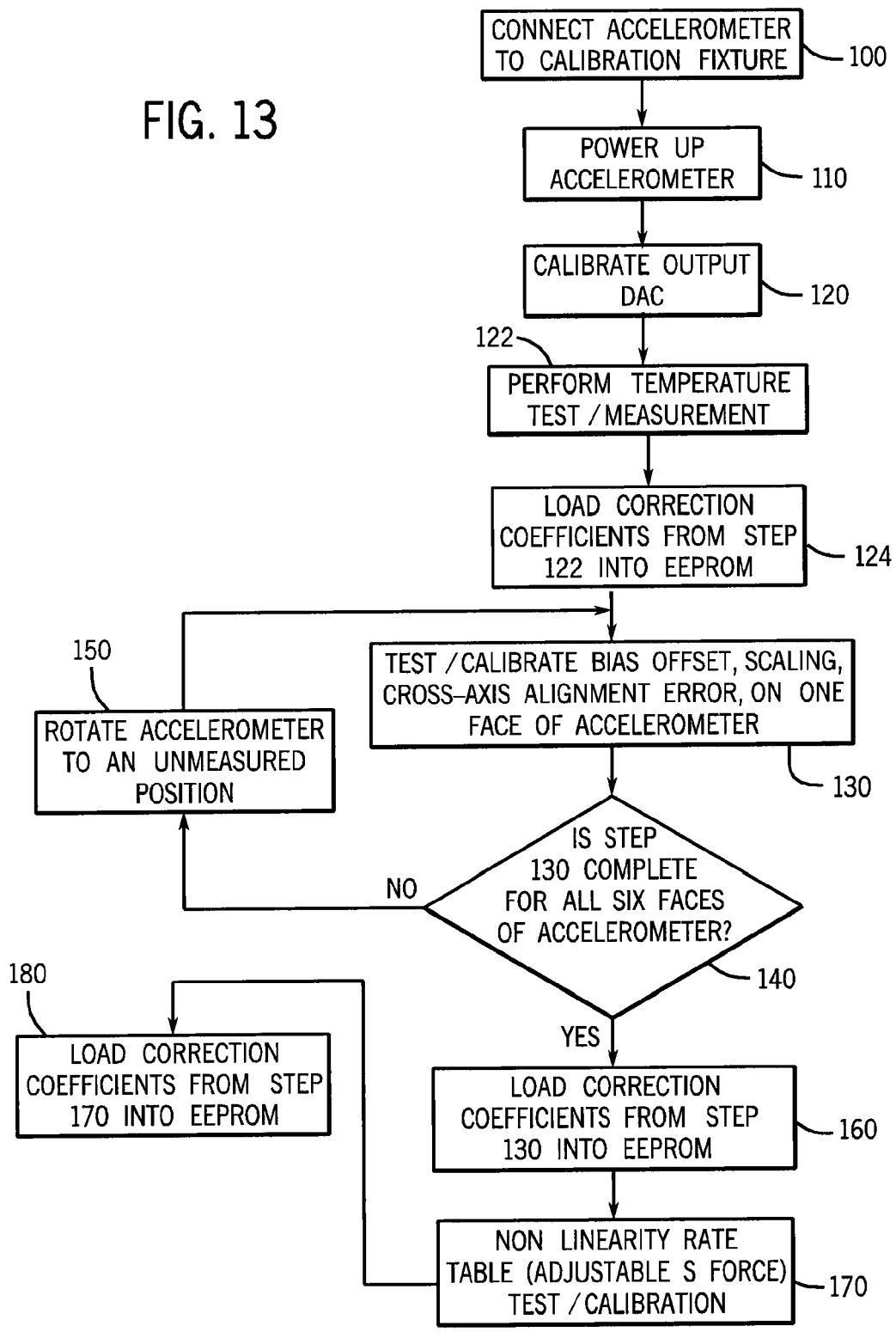
FIG. 13 is a flowchart of a calibration and test mode of the accelerometer.

FIG. 13 refers to the maintenance/calibration mode of accelerometer 34. During the maintenance/calibration mode of operation, commands are received by ASSP processor 121 COMM port. The command is serviced by the COMM module (process 6) and process commands (3.6). The maintenance/calibration commands enable board parameters to be read/written, firmware updates and allows calibration data to be configured in EEPROM 134. The stored calibration data is subsequently used during normal operation to apply the correction coefficients as described in the process accel channels (3.9).

In FIG. 13, step 100 connects accelerometer 34 to calibration fixture 74. Step 110 powers up accelerometer 34. Step 120 calibrates the output of DAC 154 as described in the call command. In step 122, a temperature test/measurement is performed which tests the outputs of transducers 100, 102, 104 as temperature is varied as described in the cal4 command. A cubic spline interpolation method can be used to determine the temperature correction coefficients. Step 124 loads correction coefficients from step 122 into EEPROM 134. In step 130, accelerometer 34 is used to test/measure bias offset, scaling, and cross-axis alignment error as described in the cal2 command. The definitions of bias offset, scaling and cross-axis alignment error are given below. In step 140, a determination is made if step 130 is complete for all six faces corresponding to 1 g and −1 g positions for transducers 100, 102, 104 of accelerometer 34. Step 150 rotates accelerometer 34 to an unmeasured position. In step 160, the correction coefficients are loaded from steps 130, 140, 150 into EEPROM 134 of ASSP processor 121. In step 170, different acceleration forces are applied to accelerometer 34 using a rate table which is a table that spins accelerometer 34 at varying rates, thereby providing varying accelerations as described in the cal3 command. The non-linearity correction coefficients are thus tested/measured. In step 170, a cubic spline interpolation method can be used to determine the non-linearity correction coefficients. Step 180 loads the correction coefficients from step 170 into EEPROM 134.

During the normal mode of operation, a periodic timer generates an interrupt at a predetermined rate. The interrupt is serviced by a digital signal processing loop that samples transducers 100, 102, 104 acceleration values and temperature with respective A/D converters 124, 126, 128 for each axis, apply filtering and noise reduction, as previously described in process accel channels (3.9), apply correction coefficients, as previously determined in steps 100-180, to the sampled vertical, lateral and longitudinal data and update a current value to the output D/A converter 154.

Figure 14:
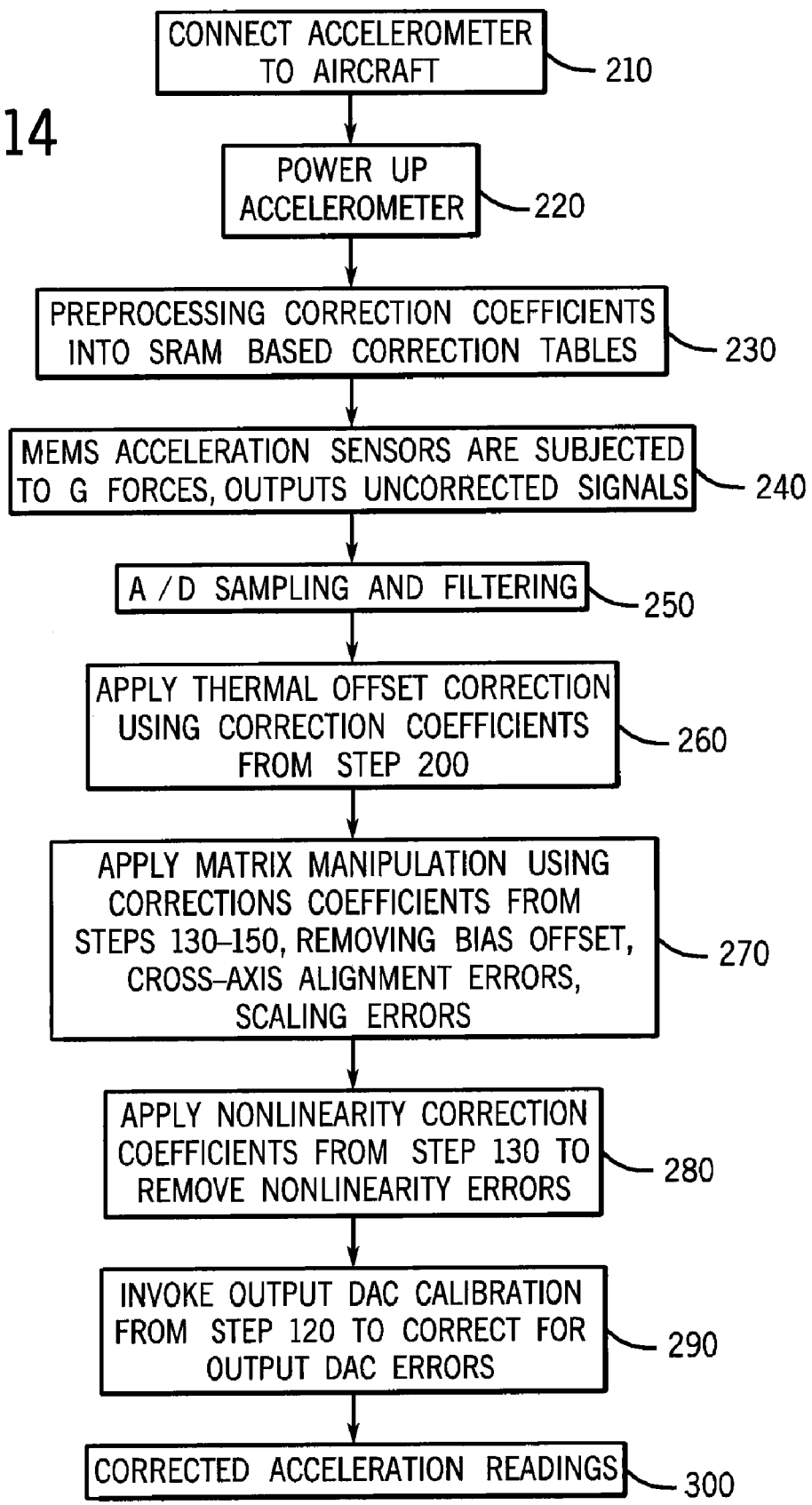
FIG. 14 is a flowchart of a normal operation mode of the accelerometer.

In FIG. 14, step 210 connects accelerometer 34 to aircraft 10. Step 220 powers up accelerometer 34. Step 230 performs a preprocessing of the correction coefficients into SRAM 138 based correction tables. In step 240, MEMS acceleration sensors 100, 102, 104 are subjected to acceleration forces, as a result of accelerations of aircraft 10, and outputs uncorrected acceleration signals. Step 250 performs A/D sampling and filtering of the uncorrected acceleration signals. Step 260 applies the thermal offset correction using correction coefficients from steps 122, 124. Step 270 applies matrix manipulations using correction coefficients from steps 130-160 removing bias offset, cross-axis alignment errors, and scaling errors. Step 280 applies non-linearity correction coefficients from steps 170 and 180 to remove non-linearity errors. Step 290 invokes output DAC 154 calibration from step 120 to correct output DAC 154 errors. In step 300, corrected acceleration readings 66, 68, 70 are provided from accelerometer 34 to data acquisition unit 24.

The following is a description of the calibration measurements of ASSP processor 121, and the model implemented in software/firmware/hardware and used by the processor to calculate the error coefficients associated with bias offset, scaling, and cross-axis coupling. The error coefficients are then arranged into a matrix form, M, having an inverse $M^{-1}$, which is used to apply corrections as part of the transducer 100, 102, 104 compensation and provide corrected output acceleration signals 156, 158, 160. Specific values are used below for illustration purposes. Actual measurements on a specific accelerometer as described above, determine the parameters used below for that specific accelerometer.

First, an ideal model is developed for a single axis accelerometer. Error coefficients are introduced into the model in order to represent the bias offset, scaling, and cross-axis alignment errors associated with non-ideal transducers orientated on 3-axis. A series of calibration measurements for a single transducer is described that allows discovery of the value of these error coefficients. After the error coefficients are determined, independently for each of the 3 transducers associated with each axis, the transducer model is used with error coefficients to correct measured transducer values.

In the following worksheet, the symbol ':=' (colon followed by equal sign) is used to denote the definition of a function or variable. The symbol '=' (equal sign alone) is used to report the value of a function or variable. Variables starting with 'E' denote an error term. Variables starting with 'V' are associated with the output of the accelerometer.

For illustration purposes, the normalized acceleration units from −1 to 1 are used for both the input acceleration, g, and the voltage output of the system, V. The desired ideal output, Videal, is a linear function of g with no offset:

$$Videal(g) := 1 \cdot g + 0 \quad (1)$$

N is the number of data points to be examined over the normalized acceleration input range.

$$N := 100 \quad (2)$$

$$j := 1 \ldots N \quad (3)$$

$$g_j := -1 + \frac{2(j-1)}{(N-1)} \quad (4)$$

Figure 15:
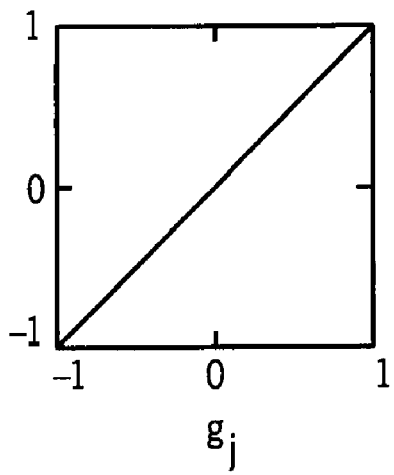
FIG. 15 is a graph of an ideal acceleration transducer output as a function of acceleration in gravitation units.

FIG. 15 shows the Videal output over the acceleration input range of N points.

EXb, EYb, and EZb are arbitrary bias offset errors associated with the X, Y, and Z transducers:

$$EXb := -0.07 \quad (5)$$

$$EYb := -0.15 \quad (6)$$

$$EZb := 0.09 \quad (7)$$

Es is an arbitrary scaling error:

$$EXs := 0.15 \quad (8)$$

$$EYs := 0.22 \quad (9)$$

$$EZs := -0.15 \quad (10)$$

Figure 16:
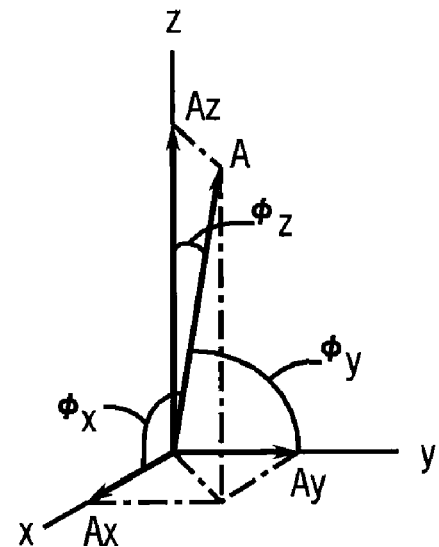
FIG. 16 is a vector diagram illustrating the angles between a single transducer axis, A, and the ideal X-Y-Z reference frame.

Referring to FIG. 16, $\phi x$, $\phi y$ and $\phi z$ are the angles between a single transducer axis, A, and the ideal x-y-z reference frame. Ax, Ay, and Az are the component vectors of A. For the z-axis transducer, the angles are denoted $Z\phi x$, $Z\phi y$ and $Z\phi z$. Likewise for the x and y-axis transducers, the angles are denoted as $X\phi x$, $X\phi y$, $X\phi z$ and $Y\phi x$, $Y\phi y$, $Y\phi z$, respectively.

For the z-axis transducer, $Z\phi x$ and $Z\phi y$ ideally is 90 degrees and $Z\phi z$ is 0 degrees. Misalignment errors within the transducer and mechanical assembly causes a deviation from the ideal alignment. $EZ\phi x$ and $EZ\phi y$ are arbitrary alignment errors for the z-axis transducer.

$$EZ\phi x := 2.5 \text{ degrees} \quad (11)$$

$$EY\phi y := 3.5 \text{ degrees} \quad (12)$$

With $EZ\phi x$ and $EZ\phi y$ fixed, $Z\phi x$, $Z\phi y$ and $Z\phi z$ are defined below:

$$Z\phi x := 90 \text{ degrees} - EZ\phi x \quad (13)$$

$$Z\phi y := 90 \text{ degrees} - EZ\phi y \quad (14)$$

$$Z\phi z := a\cos(\sqrt{1 - \cos(Z\phi x)^2 - \cos(Z\phi y)^2}) \quad (15)$$

$$Z\phi z = 4.303 \text{ degrees} \quad (16)$$

For the x-axis transducer, $X\phi y$ and $X\phi z$ ideally is 90 degrees and $X\phi x$ would be 0 degrees. Misalignment errors within the transducer and mechanical assembly cause a deviation from the ideal alignment. $EX\phi y$ and $EX\phi z$ are arbitrary alignment errors for the x-axis transducer.

$$EX\phi y := 4.6 \text{ degrees} \quad (17)$$

$$EX\phi z := 5.6 \text{ degrees} \quad (18)$$

With $EX\phi y$ and $EX\phi z$ fixed, $X\phi x$, $X\phi y$ and $X\phi z$ are defined below:

$$X\phi y := 90 \text{ degrees} - EX\phi y \quad (19)$$

$$X\phi z := 90 \text{ degrees} - EX\phi z \quad (20)$$

$$x\phi x := a\cos(\sqrt{1 - \cos(X\phi y)^2 - \cos(X\phi z)^2}) \quad (21)$$

$$X\phi x = 7.256 \text{ degrees} \quad (22)$$

For the y-axis transducer, $Y\phi x$ and $Y\phi z$ ideally is 90 degrees and $Y\phi y$ is 0 degrees. Misalignment errors within the transducer and mechanical assembly cause a deviation from the ideal alignment. EYφx and EYφz are arbitrary alignment errors for the y-axis transducer.

$$EYφx := 6.7 \text{ degrees} \tag{23}$$

$$EYφz := 7.7 \text{ degrees} \tag{24}$$

With EYφx and EYφz fixed, Yφx, Yφy and Yφz are defined below:

$$Yφx := 90 \text{ degrees} - EYφx \tag{25}$$

$$Yφz := 90 \text{ degrees} - EYφz \tag{26}$$

$$Yφy := a\cos(\sqrt{1 - \cos(Yφx)^2 - \cos(Yφz)^2}) \tag{27}$$

$$Yφy = 10.234 \text{ degrees} \tag{28}$$

VZmeasured is the uncorrected, non-ideal, measured output of the system that includes the bias offset, scale, and alignment errors for the z-axis transducer. Note that VZmeasured is a function of 3 acceleration components, one for each of the axis of the reference frame. Likewise, VXmeasured and VYmeasured are the uncorrected measured outputs of the x and y-axis transducers, respectively.

$$VZ\text{measured}(gx,gy,gz) := (1 + EZs) \cdot (gx \cdot \cos(Zφx) + gy \cdot \cos(Zφy) + gz \cdot \cos(Zφz)) + (0 + EZb) \tag{29}$$

$$VX\text{measured}(gx,gy,gz) := (1 + EXs) \cdot (gx \cdot \cos(Xφx) + gy \cdot \cos(Xφy) + gz \cdot \cos(Xφz)) + (0 + EXb) \tag{30}$$

$$VY\text{measured}(gx,gy,gz) := (1 + EYs) \cdot (gx \cdot \cos(Yφx) + gy \cdot \cos(Yφy) + gz \cdot \cos(Yφz)) + (0 + EYb) \tag{31}$$

Figure 17:
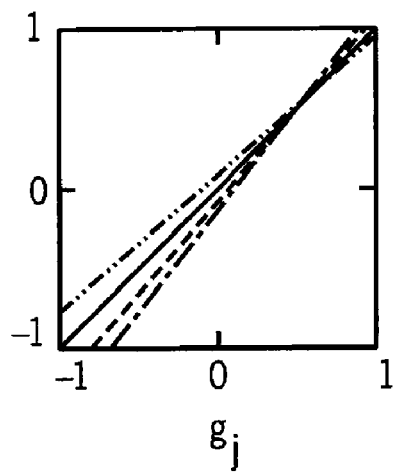
FIG. 17 is a graph of a measured acceleration transducer output deviating from an ideal acceleration transducer output over the acceleration input range.

As shown in FIG. 17, Vmeasured deviates from the desired Videal over the acceleration input range.

The following shows the calibration measurements and calculations needed to determine the bias offset, scaling, and alignment error coefficients. The following calibration procedure is illustrated only for the z-axis transducer, but the same technique could be applied in a similar fashion to discover the error terms for the x and y-axis transducers.

The bias offset, EZb, can be determined by taking two measurements with the application of a 1 g and −1 g acceleration along the major axis. VZcal1 is the measured calibration reading with a 1 g acceleration applied to the major axis. In the actual system, this is the measured transducer reading. The measured calibration result is simulated with the VZmeasure model developed above.

$$VZ\text{cal1} := VZ\text{measured}(0,0,1) \tag{32}$$

$$VZ\text{cal1} = 0.938 \tag{33}$$

VZcal2 is the measured calibration reading with a −1 g acceleration applied to the major axis, which is accomplished by inverting the unit.

$$VZ\text{cal2} := VZ\text{measured}(0,0,-1) \tag{34}$$

$$VZ\text{cal2} = -0.758 \tag{35}$$

The VZcal1 and VZcal2 results are combined to determine the bias offset error as shown below.

$$\frac{VZ\text{cal1} + VZ\text{cal2}}{2} = 0.09 \tag{36}$$

Note that the result of the calculation gives the expected value of EZb as previously defined and shown again, below:

$$EZb = 0.09 \tag{37}$$

With EZb now known, the scaling error, EZs, can now be determined by applying a 1 g acceleration to each of the two minor axis. VZcal3 and VZcal4 are the measured transducer readings with a 1 g acceleration applied to the x and y minor axis, respectively, i.e., the unit is on its side.

$$VZ\text{cal3} := VZ\text{measured}(1,0,0) \tag{38}$$

$$VZ\text{cal3} = 0.127 \tag{39}$$

$$VZ\text{cal4} := VZ\text{measured}(0,1,0) \tag{40}$$

$$VZ\text{cal4} = 0.142 \tag{41}$$

VZmag is the magnitude of the resultant acceleration vector after summing the component 1 g measurements for all three axis, major plus both minor axis. Note that the previously discovered bias error, EZb, is subtracted from the measured value before summing.

$$VZ\text{mag} := \sqrt{(VZ\text{cal1} - EZb)^2 + (VZ\text{cal3} - EZb)^2 + (VZ\text{cal4} - EZb)^2} \tag{42}$$

$$VZ\text{mag} = 0.85 \tag{43}$$

The scaling error, EZs, is the magnitude minus 1.

$$VZ\text{mag} - 1 = -0.15 \tag{44}$$

Note that the result of the calculation gives the expected value of EZs as previously defined and shown again, below:

$$EZs = -0.15 \tag{45}$$

The alignment errors, EZφx and EZφy, can be determined by using the previously measured acceleration on the minor axis as shown below. Note that the previous results for the bias offset and scale errors are used in the calculations.

$$90 \text{ degrees} - \left[a\cos\left[\frac{Vz\text{cal3} - EZb}{VZ\text{mag}}\right]\right] = 2.5 \text{ degrees} \tag{46}$$

$$90 \text{ degrees} - \left[a\cos\left[\frac{VZ\text{cal4} - EZb}{VZ\text{mag}}\right]\right] = 3.5 \text{ degrees} \tag{47}$$

The alignment error to the Z-axis, Zφz, is determined below in a similar fashion:

$$\left[a\cos\left[\frac{VZ\text{cal1} - EZb}{VZ\text{mag}}\right]\right] = 4.303 \text{ degrees} \tag{48}$$

Note that the result of these calculations gives the expected value of EZφx, EZφy, and Zφz as previously defined and shown again, below:

$$EZφx := 2.5 \text{ degrees} \tag{49}$$

$$EZφy := 3.5 \text{ degrees} \tag{50}$$

$$Zφz := 4.303 \text{ degrees} \tag{51}$$

The following illustrates how the offset bias, scale and alignment error coefficients determined through the calibration can be used to correct measurements. Using actual values as an illustrative example, gx, gy, and gz are arbitrary true accelerations applied to the 3-axis accelerometer.

$$gx := 0.5 \tag{52}$$

$$gy := -0.6 \tag{53}$$

$$gz := 0.7 \tag{54}$$

VXm, VYm, and VZm are the measured, uncorrected values reported by the transducer, as simulated by the model with error coefficients. As shown below, the measured values differ from the true values due to the errors associated with bias offset, scaling, and cross axis coupling.

$$VXm := VX\text{measured}(gx, gy, gz) \tag{55}$$

$$VYm := VY\text{measured}(gx, gy, gz) \tag{56}$$

$$VZm := VZ\text{measured}(gx, gy, gz) \tag{57}$$

$$VXm = 0.524 \tag{58}$$

$$VYm = -0.685 \tag{59}$$

$$VZm = 0.671 \tag{60}$$

The error coefficients, previously derived from the calibration data, are organized into a matrix, M.

$$M := \begin{bmatrix} (1+EXs) \cdot \cos(X\phi x) & (1+EXs) \cdot \cos(X\phi y) & (1+EXs) \cdot \cos(X\phi z) & EXb \\ (1+EYs) \cdot \cos(Y\phi x) & (1+EYs) \cdot \cos(Y\phi y) & (1+EYs) \cdot \cos(Y\phi z) & EYb \\ (1+EZs) \cdot \cos(Z\phi x) & (1+EZs) \cdot \cos(Z\phi y) & (1+EZs) \cdot \cos(Z\phi z) & EZb \\ 0 & 0 & 0 & 1 \end{bmatrix} \tag{61}$$

$$M = \begin{bmatrix} 1.141 & 0.092 & 0.112 & -0.07 \\ 0.142 & 1.201 & 0.163 & -0.15 \\ 0.037 & 0.052 & 0.848 & 0.09 \\ 0 & 0 & 0 & 1 \end{bmatrix} \tag{62}$$

As illustrated below, the matrix form of the error coefficients, when multiplied by the vector of true accelerations, yields the expected measured transducer values.

$$M \cdot \begin{bmatrix} gx \\ gy \\ gz \\ 1 \end{bmatrix} = \begin{bmatrix} 0.524 \\ -0.685 \\ 0.671 \\ 1 \end{bmatrix} \tag{63}$$

The matrix form above for the error coefficients suggests that the vector of true accelerations can be computed by finding the inverse of matrix M, which is shown below:

$$M^{-1} = \begin{bmatrix} 0.888 & -0.064 & -0.105 & 0.062 \\ -0.101 & 0.847 & -0.15 & 0.134 \\ -0.033 & -0.049 & 1.194 & -0.117 \\ 0 & 0 & 0 & 1 \end{bmatrix} \tag{64}$$

The inverse of matrix M, when multiplied with the measured values from the transducer, yields the true acceleration as shown below:

$$M^{-1} \cdot \begin{bmatrix} VXm \\ VYm \\ VZm \\ 1 \end{bmatrix} = \begin{bmatrix} 0.5 \\ -0.6 \\ 0.7 \\ 1 \end{bmatrix} \tag{65}$$

The result above exactly matches the true acceleration (gx, gy, and gz) defined above and repeated below:

$$gx = 0.5 \tag{66}$$

$$gy = -0.6 \tag{67}$$

$$gz = 0.7 \tag{68}$$

Figure 19:
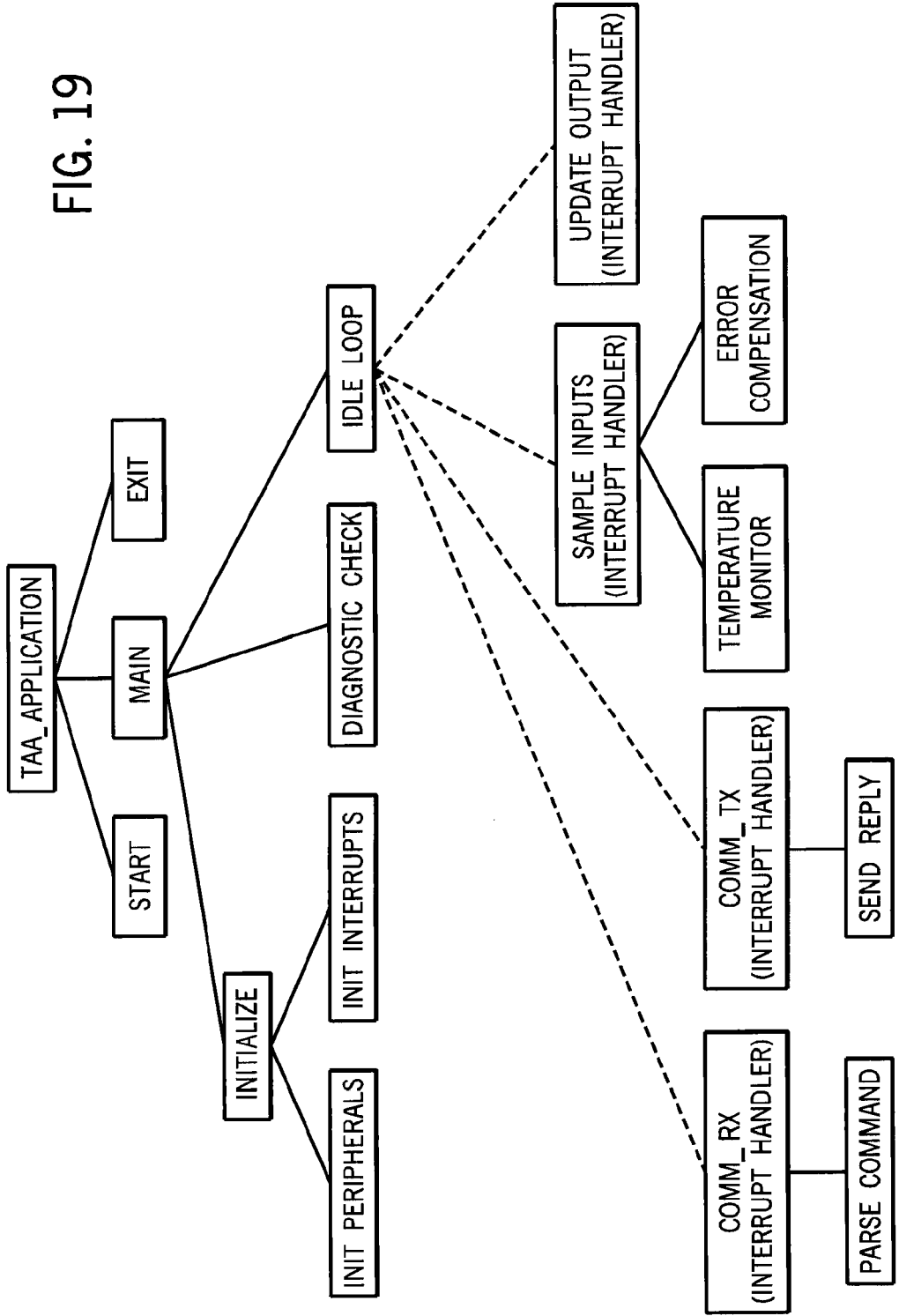
FIG. 19 is a functional tree of the application software.

The foregoing method of error correction can be implemented, at least in part, by a variety of software instructions. FIGS. 18A-18B and 19 give examples of how various aspects of the software/firmware can be organized in a boot loader partition and an application partition, respectively. Each of the blocks in FIGS. 18A-18B and 19 typically represent software subroutines having a plurality of instructions therein.

The present invention is not limited to capacitive type MEMS acceleration transducers described above. Other acceleration transducers which can be used with the present invention include, but are not limited to, piezo-film or piezo-electric sensor/acceleration transducers, suspended cantilever beam or proof mass acceleration transducers, shear mode accelerometer, thermal acceleration transducers, bulk micromachined capacitive, bulk micromachined piezo resistive acceleration transducers, capacitive spring mass based acceleration transducers, electromechanical servo (servo force balance) acceleration transducers, null-balance acceleration transducers, strain gauge—PCB piezotronics acceleration transducers, resonance acceleration transducers, magnetic induction acceleration transducers, optical, surface acoustic wave (SAW) acceleration transducers, and laser accelerometers.

The present invention is not limited to general aviation and commercial aircraft, but can also be adapted to helicopters, propeller driven aircraft, experimental aircraft, drones, ultralight aircraft, blimps, balloons, military aircraft, and flying wings. Further, the present invention can be adapted to a variety of marine transportation systems such as boats, submarines, hovercraft, also spanning to pleasure/recreational, scientific, commercial, and military. Yet further, and as is also apparent, the present invention is not limited to air and sea transportation systems, but can also be adapted to land and space travel. Consequently, the present invention can be adapted to a variety of transportation systems recorder systems, or other systems, arranged for use in trains, trucks, automobiles, motorcycles, and spacecraft.

While one or more embodiments of the present invention have been illustrated in detail, the skilled artisan will appreciate that modifications and adaptations to those embodiments may be made without departing from the scope of the present invention as set forth in the following claims.

What is claimed:

1. An accelerometer, comprising:
    vertical, lateral, and longitudinal acceleration transducers producing uncorrected analog acceleration signals and thermal signals, the uncorrected analog acceleration signals representing vertical, lateral, and longitudinal components of acceleration, and the thermal signals including a signal corresponding to a temperature of the vertical acceleration transducer, a signal corresponding to a temperature of the lateral acceleration transducer, and a signal corresponding to a temperature of the longitudinal acceleration transducer;
    an error correction system connected to the acceleration transducers for receiving the uncorrected analog acceleration signals and the thermal signals, the error correction system including, (a) a system controller for generating a plurality of correction coefficients based, at least in part, on sampling of each of the thermal signals, (b) an analog to digital converter which converts the uncorrected analog acceleration signals to uncorrected digital acceleration signals, and (c) an error compensation circuit receiving the correction coefficients to compensate the uncorrected digital acceleration signals and produce corrected digital acceleration signals.

2. The accelerometer of claim 1, wherein the error correction system further includes a digital to analog converter which converts the corrected digital acceleration signals to corrected analog acceleration signals.

3. The accelerometer of claim 1, wherein the correction coefficients generated by the system controller include coefficients that are based on a plurality of thermal calibration measurements that account for a thermal hysteresis effect at each of the vertical, lateral, and horizontal acceleration transducers.

4. The accelerometer of claim 1, wherein the system controller arranges a plurality of calibration measurements into a matrix, and wherein the system controller inverts the matrix to calculate the correction coefficients.

5. The accelerometer of claim 1, wherein each acceleration transducer is a micro-electro-mechanical systems transducer.

6. The accelerometer of claim 1, wherein the error correction system further includes a filter for filtering the uncorrected digital acceleration signals.

7. The accelerometer of claim 1, wherein the error compensation circuit corrects for errors selected from the group consisting of bias offset, cross-axis alignment errors, scaling errors, and thermal offset.

8. The accelerometer of claim 1, wherein the error compensation circuit corrects each of the vertical, lateral, and longitudinal components of acceleration in terms of the other components of acceleration.

9. An accelerometer-based system, comprising:

a flight recorder;

vertical, lateral, and longitudinal acceleration transducers connected to the flight recorder, the acceleration transducers producing uncorrected analog acceleration signals and thermal signals, the uncorrected analog acceleration signals representing vertical, lateral, and longitudinal components of acceleration and the thermal signals including a signal corresponding to a temperature of the vertical acceleration transducer, a signal corresponding to a temperature of the lateral acceleration transducer, and a signal corresponding to a temperature of the longitudinal acceleration transducer; and an error correction system connected to the acceleration transducer for receiving the uncorrected analog acceleration signals and the thermal signals, the error correction system including, (a) a system controller for generating a plurality of correction coefficients based, at least in part, on a sampling of each of the thermal signals, (b) an analog to digital converter which converts the uncorrected analog acceleration signals to uncorrected digital acceleration signals, and (c) an error compensation circuit receiving the correction coefficients to compensate the uncorrected digital acceleration signals and produce corrected digital acceleration signals.

10. The accelerometer-based system of claim 9, wherein the error correction system further includes a digital to analog converter which converts the corrected digital acceleration signals to corrected analog acceleration signals.

11. The accelerometer-based system of claim 9, wherein the system controller arranges a plurality of calibration measurements into a matrix.

12. The accelerometer-based system of claim 11, wherein the system controller inverts the matrix to calculate the correction coefficients.

13. The accelerometer-based system of claim 9, wherein each acceleration transducer is a micro-electro-mechanical systems transducer.

14. The accelerometer-based system of claim 9, wherein the error correction system further includes a filter for filtering the uncorrected digital acceleration signals.

15. The accelerometer-based system of claim 9, wherein the error compensation circuit corrects for errors selected from the group consisting of bias offset, cross-axis alignment errors, scaling errors, and thermal offset.

16. The accelerometer-based system of claim 9, wherein the error compensation circuit corrects each of the vertical, lateral, and longitudinal components of acceleration in terms of the other components of acceleration.

17. An accelerometer, comprising:

vertical, lateral, and longitudinal acceleration transducer producing uncorrected acceleration signals and thermal signals, the thermal signals including a signal corresponding to a temperature of the vertical acceleration transducer, a signal corresponding to a temperature of the lateral acceleration transducer, and a signal corresponding to a temperature of the longitudinal acceleration transducer; and an error correction system connected to the acceleration transducer for receiving the uncorrected acceleration signals and the thermal signals, the error correction system including, (a) a system controller for generating a plurality of correction coefficients based, at least in part, on a sampling of each of the thermal signals, and (b) an error compensation circuit receiving the correction coefficients to compensate the uncorrected acceleration signals and produce corrected acceleration signals.

18. The accelerometer of claim 17, wherein the corrected acceleration signals are digital or analog signals.

19. The accelerometer of claim 17, wherein the uncorrected analog acceleration signals represent vertical, lateral, and longitudinal components of acceleration.

20. The accelerometer of claim 17, wherein the system controller arranges a plurality of calibration measurements into a matrix and inverts the matrix to calculate the plurality of correction coefficients.

21. The accelerometer of claim 17, wherein the error correction system further includes a filter for filtering the uncorrected digital acceleration signals.

22. A method of compensating for errors in an accelerometer, comprising:

providing vertical, lateral, and longitudinal acceleration transducers producing uncorrected analog acceleration signals and thermal signals, the uncorrected analog acceleration signals representing vertical, lateral, and longitudinal components of acceleration, and the thermal signals including a signal corresponding to a temperature of the vertical acceleration transducer, a signal corresponding to a temperature of the lateral acceleration transducer, and a signal corresponding to a temperature of the longitudinal acceleration transducer; and generating a plurality of correction coefficients based, at least in part, on a sampling of each of the thermal signals, converting the uncorrected analog acceleration signals to uncorrected digital acceleration signals; and compensating the uncorrected digital acceleration signals with the correction coefficients to produce corrected digital acceleration signals.

23. The method of claim 22, further including converting the corrected digital acceleration signals to corrected analog acceleration signals.

24. The method of claim 22, further including measuring a plurality of calibration data;

arranging the plurality of calibration data into a matrix; and inverting the matrix to produce the correction coefficients.

25. The method of claim 22, further including filtering the uncorrected digital acceleration signals.

26. The method of claim 22, wherein the step of compensating the uncorrected digital acceleration signals with the correction coefficients further includes correcting for errors selected from the group consisting of bias offset, cross-axis alignment errors, scaling errors, and thermal offset.

27. The method of claim 22, wherein the step of compensating the uncorrected digital acceleration signals with the correction coefficients further includes correcting each of the vertical, lateral, and longitudinal components of acceleration in terms of the other components of acceleration.

* * * * *